United States Patent
Wang

(10) Patent No.: US 11,224,813 B2
(45) Date of Patent: Jan. 18, 2022

(54) METHOD AND APPARATUS FOR CONTROLLING FALLING OF VIRTUAL OBJECT, ELECTRONIC DEVICE, AND STORAGE MEDIUM

(71) Applicant: Tencent Technology (Shenzhen) Company Limited, Shenzhen (CN)

(72) Inventor: Yu Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/924,988

(22) Filed: Jul. 9, 2020

(65) Prior Publication Data

US 2020/0338451 A1    Oct. 29, 2020

Related U.S. Application Data

(63) Continuation of application No. PCT/CN2019/081315, filed on Apr. 3, 2019.

(30) Foreign Application Priority Data

May 18, 2018  (CN) .......................... 201810482237.6

(51) Int. Cl.
*A63F 13/56* (2014.01)
*A63F 13/77* (2014.01)
*A63F 13/795* (2014.01)

(52) U.S. Cl.
CPC .............. *A63F 13/56* (2014.09); *A63F 13/77* (2014.09); *A63F 13/795* (2014.09)

(58) Field of Classification Search
CPC ................................ A63F 13/56; A63F 13/803
See application file for complete search history.

(56) References Cited

U.S. PATENT DOCUMENTS

| 2001/0035906 A1* | 11/2001 | Fukuda | .................. | A63F 13/10 |
| | | | | 348/169 |
| 2002/0021298 A1* | 2/2002 | Fukuda | .................. | A63F 13/10 |
| | | | | 345/427 |

(Continued)

FOREIGN PATENT DOCUMENTS

| CN | 105214308 A | 1/2016 |
| CN | 105531003 A | 4/2016 |

(Continued)

OTHER PUBLICATIONS

Suiwei Chunfang, "PlayerUnknown's Battlegrounds How to Follow the Skydiving and Teammates to Land in the Same Place—Baidu Experience," retrieved from the Internet: https://jingyan.baidu.com/article/ad310e801d52261849f49e90.htm, Apr. 1, 2018.
Tencent Technology, ISR, PCT/CN2019/081315, Jul. 3, 2019, 2 pgs.
Tencent Technology, WO, PCT/CN2019/081315, Jul. 3, 2019, 4 pgs.

(Continued)

*Primary Examiner* — Jay Trent Liddle
(74) *Attorney, Agent, or Firm* — Morgan, Lewis & Bockius LLP

(57) ABSTRACT

A method for controlling falling of a virtual object is performed at an electronic device, the method including: displaying, in a virtual scene, a follow button in an area corresponding to a first virtual object, the follow button being used for controlling a second virtual object to follow the first virtual object to fall; detecting a touch operation on the follow button of the first virtual object; obtaining falling dynamic information of the first virtual object; and controlling the second virtual object to fall in the virtual scene according to the falling dynamic information.

19 Claims, 14 Drawing Sheets

(56) References Cited

U.S. PATENT DOCUMENTS

| | | | | |
|---|---|---|---|---|
| 2002/0140696 | A1* | 10/2002 | Futamura | A63F 13/57 345/419 |
| 2005/0221880 | A1* | 10/2005 | Kando | A63F 13/822 463/9 |
| 2010/0273544 | A1* | 10/2010 | Koganezawa | A63F 13/837 463/2 |
| 2011/0039618 | A1 | 2/2011 | Ichiyanagi et al. | |
| 2020/0171387 | A1* | 6/2020 | Russell | G06F 3/011 |
| 2020/0298121 | A1* | 9/2020 | Deng | A63F 13/537 |

FOREIGN PATENT DOCUMENTS

| | | |
|---|---|---|
| CN | 107273037 A | 10/2017 |
| CN | 107551542 A | 1/2018 |
| CN | 107899241 A | 4/2018 |
| CN | 107930105 A | 4/2018 |
| CN | 108037888 A | 5/2018 |
| CN | 108744507 A | 11/2018 |
| WO | WO 2006070914 A1 | 7/2006 |

OTHER PUBLICATIONS

Tencent Technology, IPRP, PCT/CN2019/081315, Nov. 24, 2020, 5 pgs.

18183 Game Network, "The Goal Has Been Set to Eat Chicken Wilderness Action Finals Skills Sharing", Tianjin Changwan Network Technology Co., Ltd., Jan. 18, 2018, 6 pgs., Retrieved from the Internet: https://baiHahao.baidu.com/s?=1589809794914374896 &wfr=spider&for=pc.

Xiaomi Shootout, "What Do the Eyes in the Upper Left Corner of the Chicken..." Oct. 30, 2017, 3 pgs., Retrieved from the Internet: https://tieba.baidu.com/p/5395181531?red tag=3282394351.

Xiaocha Commentary, "Stimulate the Battlefield, to Share Tips on Eating Chicken, Learn That You Can Also Eat Chicken Easily", Creators in the Field of High-Quality Games, 22APR2018, 5 pgs., Retrieved from the Internet: https://baijiahao.baidu.com/s?id=1598438247413957351& wfr=spider&for=pc.

Li Gang, "PlayerUnknown's Battlegrounds Stimulate Free Perspective Where and How to Switch Free Perspective", 87G Mobile Games Network, 3 pgs., Feb. 9, 2018, Retrieved from the Internet: http://www.87g.com/pg/71726.html.

* cited by examiner

1 YYYY
2 XXXX
3 CCCC
4 ZZZZ

Follow function
enable button

2 XXXX
Invites you to
follow to parachute

Reject button

Accept button
(N seconds)

METHOD AND APPARATUS FOR CONTROLLING FALLING OF VIRTUAL OBJECT, ELECTRONIC DEVICE, AND STORAGE MEDIUM

CROSS REFERENCE TO RELATED APPLICATIONS

This application is a continuation application of PCT Patent Application No. PCT/CN2019/081315, entitled "METHOD AND APPARATUS FOR CONTROLLING FALL OF VIRTUAL OBJECT, ELECTRONIC DEVICE AND STORAGE MEDIUM" filed on Apr. 3, 2019, which claims priority to Chinese Patent Application No. 201810482237.6, entitled "METHOD AND APPARATUS FOR CONTROLLING FALLING OF VIRTUAL OBJECT, ELECTRONIC DEVICE, AND STORAGE MEDIUM" filed May 18, 2018, all of which are incorporated by reference in their entirety.

FIELD OF THE TECHNOLOGY

This application relates to the field of computer technologies, and in particular, to a method and an apparatus for controlling falling of a virtual object, an electronic device, and a storage medium.

BACKGROUND OF THE DISCLOSURE

With the development of computer technologies, people can simulate a scene in real life by using a simulation technology. The simulation technology is an experimental method in which a model of a research object is established by using a similarity principle and the regularity of a prototype is indirectly studied by using the model. For example, in a game application, people may control a virtual object to move in a virtual scene. People may control the virtual object to take an aerial vehicle to enter the virtual scene, and control the virtual object to leave the aerial vehicle and fall in the virtual scene, to simulate a process in a real scene that a person takes a plane or another vehicle and leaves the plane to fall on the ground.

Currently, in a conventional method for controlling falling of a virtual object, a leave button is usually provided. When a touch operation of a user on the leave button is detected, the virtual object is controlled to fall in the virtual scene. In addition, a virtual joystick area is provided, a touch operation of the user on the virtual joystick area is detected to determine the moving direction and moving speed of the virtual object in a falling process, so that falling dynamic information of the virtual object is controlled. In a team game, it is usually necessary for virtual objects of the same team to fall into the same area. The virtual objects are relatively close to each other to cooperate with each other to fight against virtual objects of another team. However, based on a conventional method for controlling falling of a virtual object, each user in a team needs to autonomously control a virtual object to fall, and operations are relatively complex, resulting in low control efficiency.

SUMMARY

Embodiments of this application provide a method and an apparatus for controlling falling of a virtual object, an electronic device, and a storage medium.

A method for controlling falling of a virtual object is performed by an electronic device, the method including:

displaying, in a virtual scene, a follow button in an area corresponding to a first virtual object, the follow button being used for controlling a second virtual object to follow the first virtual object to fall;

detecting a touch operation on the follow button of the first virtual object;

obtaining falling dynamic information of the first virtual object; and controlling the second virtual object to fall in the virtual scene according to the falling dynamic information.

An electronic device is provided, including a processor and a memory, the memory storing a plurality of computer-executable instructions, the computer-executable instructions, when executed by the processor, causing the electronic device to perform the following steps:

displaying, in a virtual scene, a follow button in an area corresponding to a first virtual object, the follow button being used for controlling a second virtual object to follow the first virtual object to fall;

detecting a touch operation on the follow button of the first virtual object;

obtaining falling dynamic information of the first virtual object; and controlling the second virtual object to fall in the virtual scene according to the falling dynamic information.

A non-transitory computer-readable storage medium is provided, storing a plurality of computer-executable instructions, the computer-executable instructions, when executed by a processor of an electronic device, causing the electronic device to perform the following steps:

displaying, in a virtual scene, a follow button in an area corresponding to a first virtual object, the follow button being used for controlling a second virtual object to follow the first virtual object to fall;

detecting a touch operation on the follow button of the first virtual object;

obtaining falling dynamic information of the first virtual object; and controlling the second virtual object to fall in the virtual scene according to the falling dynamic information.

Details of one or more embodiments of this application are provided in the following accompanying drawings and descriptions. Other features, objectives, and advantages of this application become more obvious in the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
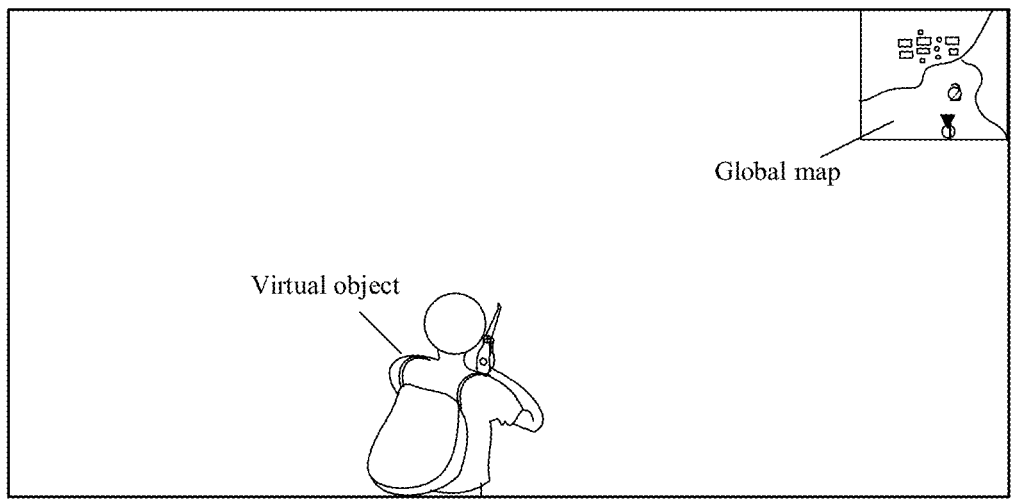
FIG. 1 is a schematic diagram of an interface of a terminal according to an embodiment of this application.

To make the objectives, technical solutions, and advantages of this application clearer, the following further describes the implementations of this application in detail with reference to the accompanying drawings.

Embodiments of this application mainly relate to a video game or a simulated training scenario. A video game scenario is used as an example. A user may perform an operation on a terminal in advance. After detecting the operation of the user, the terminal may download a game configuration file of the video game. The game configuration file may include an application program, interface display data or virtual scene data of the video game, so that when logging in to the video game on the terminal, the user may invoke the game configuration file to render and display an interface of the video game. The user may perform a touch operation on the terminal. After detecting the touch operation, the terminal may determine game data corresponding to the touch operation, and render and display the game data. The game data may include data of a virtual scene, behavioral data of a virtual object in the virtual scene, and the like.

A virtual scene in this application may be used to simulate a three-dimensional virtual space or two-dimensional virtual space. The three-dimensional virtual space or two-dimensional virtual space may be an open space. The virtual scene may be used to simulate a real environment in reality. For example, the virtual scene may include the sky, a land, an ocean, and the like. The land may include environmental elements such as a desert or a city. The user may control a virtual object to move in the virtual scene. The virtual object may be a virtual image used for representing the user in the virtual scene. The virtual image may be in any form, for example, a person or an animal, which is not limited in this application. The virtual scene may include a plurality of virtual objects. Each virtual object has a shape and a volume in the virtual scene and occupies some space in the virtual scene.

A shooting game is used as an example. The user may control a virtual object to freely fall, glide or open a parachute to fall in the sky of the virtual scene, to run, jump, crawl or stoop on the land, or to swim, float or dive in the ocean. Certainly, the user may control the virtual object to move in the virtual scene by a vehicle. The foregoing scene is merely used as an example for description herein, and this is not specifically limited in the embodiments of this application. The user may control the virtual object to fight against another virtual object by using a weapon. The weapon may be a cold weapon or a firearm, which is not specifically limited in this application.

For example, the virtual object is usually in an aerial vehicle-taking state when entering the virtual scene. After leaving the aerial vehicle, the virtual object is about to enter a falling state in the virtual scene due to the influence of gravity. The falling state indicates that the virtual object is in a sky region of the virtual scene, and affected by gravity, a coordinate of the virtual object in a vertical direction in the virtual scene keeps decreasing. The terminal may use a ray detection method to determine that the virtual object is in a falling state. The terminal may emit a ray vertically downward from a designated position of the virtual object to detect a distance between the virtual object and an object in a vertical downward direction of the virtual object. When the distance is not zero, the terminal may determine that the virtual object is in a falling state. Specifically, the terminal may invoke a ray detection function to perform a ray detection operation to detect, according to the ray, whether there is collision with the ground or an object on the ground to determine whether the virtual object is in contact with the ground or the object on the ground. If the virtual object is not in contact with the ground or an object on the ground, it can be determined that the virtual object is in a falling state. In a possible implementation, the terminal may alternatively use a ray to detect the coordinates of an object in the vertical downward direction of the virtual object in a world coordinate system and determine whether the virtual object is in contact with the object based on the coordinates of the object and the coordinates of the virtual object, to determine whether the virtual object is in a falling state. In another possible implementation, the terminal may alternatively detect whether the value of a ray vector from the virtual object to the ground or an object on the ground is zero to determine whether the virtual object is in a falling state. When the value of the ray vector is not zero, it can be determined that the virtual object is in a falling state. Certainly, after detecting the ground or an object on the ground through a ray, the terminal may further project the object or the ground and the virtual object on a plane, to calculate a distance between the virtual object and the object or the ground. If there is an ocean region below the virtual object, a determination method is similar to the foregoing method. How to specifically use a ray detection method to determine whether the virtual object is in a falling state is not specifically limited in this embodiment of this application.

Certainly, when the virtual object falls to the ground or an object on the ground, the virtual object may be in a standing state. When the virtual object falls to the ocean, the virtual object may be in a floating state in water. In a vertical direction, in addition to the gravity, the virtual object may further have a support force from the ground, or have vertically upward buoyancy in the ocean, so that the virtual object no longer falls. The user may control the virtual object to walk, run, jump, and crawl forward on the land or to float and swim in the ocean.

When rendering and displaying the virtual scene, the terminal may display the virtual scene in full screen. While displaying the virtual scene in a current display interface, the terminal may further display a global map independently in a first preset area of the current display interface. Alternatively, the terminal may display the global map only when detecting a click operation on a preset button. The global map is used for displaying a thumbnail of the virtual scene, and the thumbnail is used for describing a geographical feature such as the terrain, landform, and geographic location corresponding to the virtual scene. Certainly, the terminal may further display a thumbnail of a virtual scene within a particular distance from the current virtual object in the current display interface. When a click operation on the global map is detected, a thumbnail of an overall virtual scene is displayed in a second preset area of the current display interface of the terminal, so that the user can not only view the virtual scene around but also view the overall virtual scene. When detecting a zoom operation on the complete thumbnail, the terminal may also perform zoomed display of the complete thumbnail. Specific display positions and shapes of the first preset area and the second preset area may be set according to a user operation habit. For example, to prevent the virtual scene from being excessively blocked, the first preset area may be a rectangular area in the upper right corner, the lower right corner, the upper left corner or the lower left corner of the current display interface, and the second preset area may be a square area on the right or the left of the current display interface. Certainly, the first preset area and the second preset area may be alternatively circular areas or areas of another shape. A specific display position and shape of the preset area are not limited in this embodiment of this application. For example, as shown in FIG. 1, a terminal displays a virtual scene in a current display interface. A virtual object may be displayed in the virtual scene, and a global map is displayed in the upper right corner of the current display interface.

An example in which the terminal is a terminal of a user is used. A virtual object controlled by another terminal other than the terminal may be referred to as a first virtual object, and a virtual object controlled by the terminal of the user may be referred to as a second virtual object. In this embodiment of this application, a virtual object belonging to the same team as the second virtual object in a virtual scene may be referred to as a first virtual object.

Figure 2:
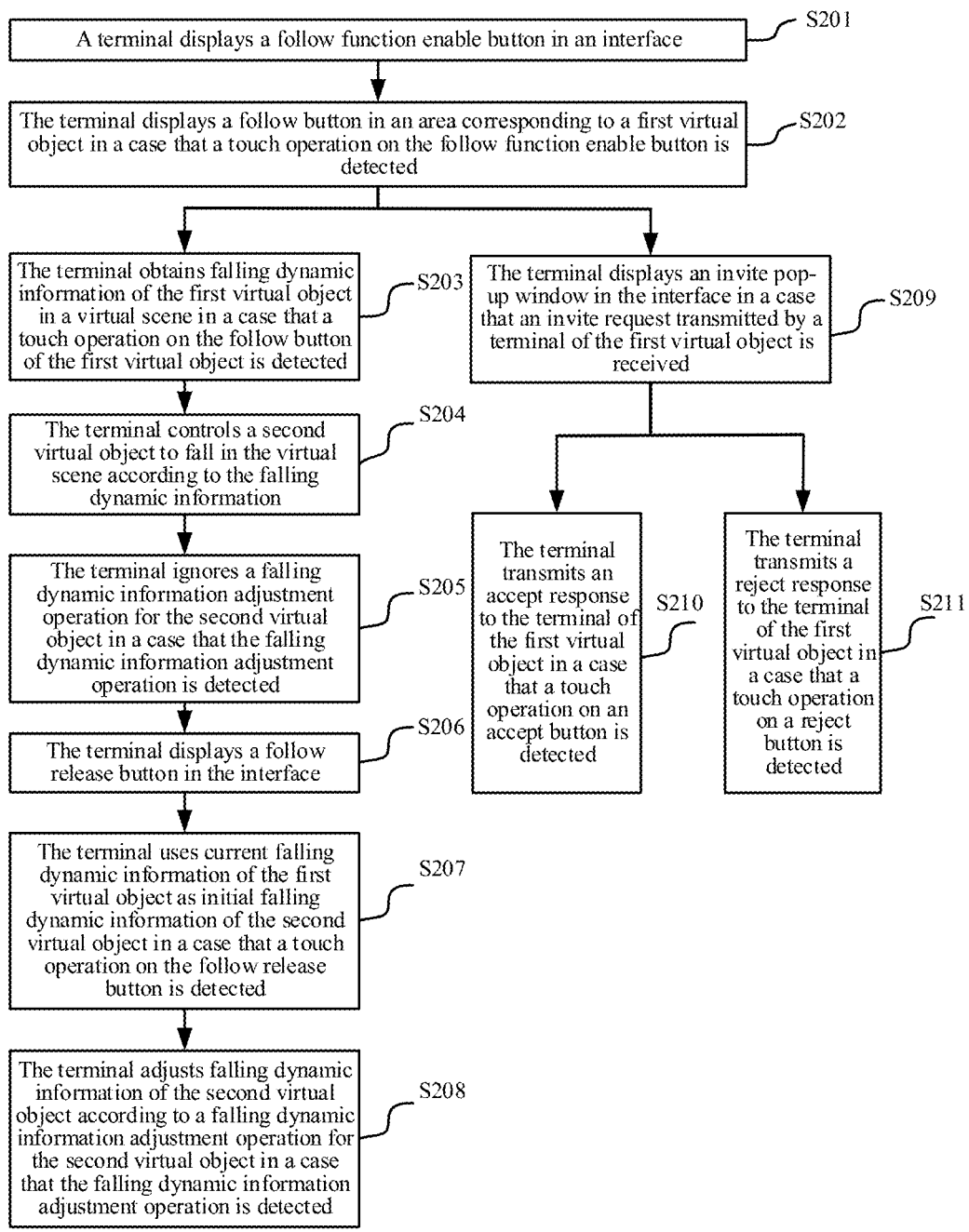
FIG. 2 is a flowchart of a method for controlling falling of a virtual object according to an embodiment of this application.

FIG. 2 is a flowchart of a method for controlling falling of a virtual object according to an embodiment of this application. Referring to FIG. 2, the method may include the following steps:

S201: A terminal displays a follow function enable button in an interface.

In this embodiment of this application, the terminal may provide a follow function. A second virtual object may follow a first virtual object to fall, and the first virtual object may also follow the second virtual object to fall. The terminal may display the follow function enable button in the interface. The follow function enable button is used for triggering the display of a follow button, so that subsequently a user may perform a touch operation on the follow button, to implement the function that the second virtual object follows the first virtual object to fall.

In an embodiment, the terminal may display attribute information of the second virtual object in the interface. The attribute information may include a health value of the second virtual object, or may include a name of the second virtual object. Certainly, the attribute information may further include other information of the second virtual object, for example, the gender of a user corresponding to the second virtual object. This is not limited in this embodiment of this application. Certainly, the terminal may further display attribute information of the first virtual object in the interface, to prompt the user of the condition of the first virtual object in the virtual scene. To prevent the virtual scene from being excessively blocked, the terminal displays the attribute information in an edge area of the interface. For example, the edge area may be an upper left corner area, a lower left corner area, a lower right corner area or an upper right corner area. Certainly, the edge area may be alternatively another area, which is not limited in this embodiment of this application.

Figure 3:
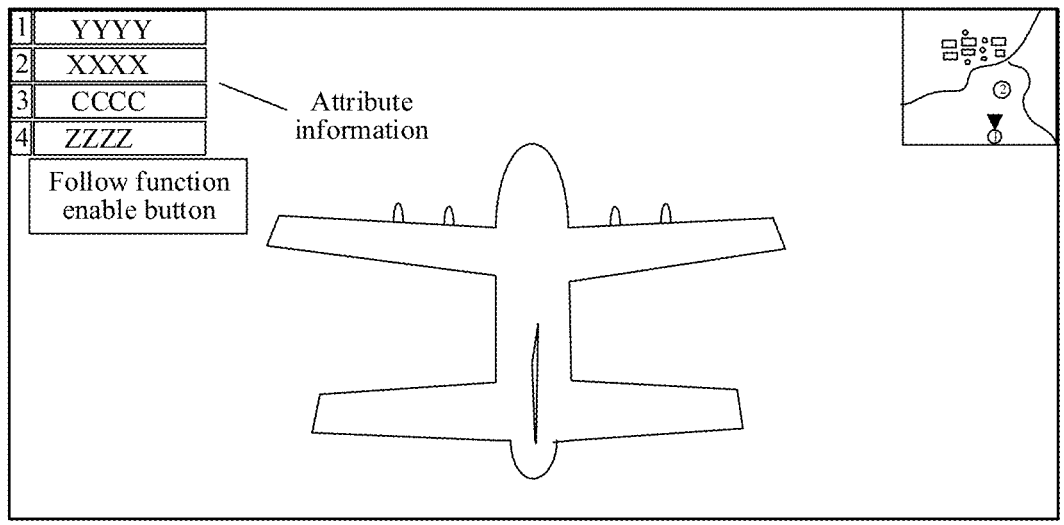
FIG. 3 is a schematic diagram of an interface of a terminal according to an embodiment of this application.

Correspondingly, a display position of the follow function enable button may be a surrounding area of the attribute information of the first virtual object, for example, a lower area, an upper area, a left area, or a right area of the attribute information. The display position of the follow function enable button and a display area of the attribute information may be preset by a related technician or may be defined by a user according to a use habit of the user. This is not limited in this embodiment of this application. For example, as shown in FIG. 3, the terminal may display the attribute information of the first virtual object and the second virtual object in an upper left corner area of the interface, and display the follow function enable button in a lower area of the attribute information.

S202: The terminal displays a follow button in an area corresponding to a first virtual object in a case that a touch operation on the follow function enable button is detected, the follow button being used for controlling a second virtual object to follow the first virtual object to fall.

The area corresponding to the first virtual object may be a surrounding area of the attribute information of the first virtual object, so that related information of the same first virtual object can be displayed correspondingly, and the user may also quickly learn the attribute information of the first virtual object corresponding to the follow button from the display position of the follow button. For example, the area corresponding to the first virtual object may be a left area, a right area, an upper area or a lower area of the attribute information of the first virtual object. Certainly, the area corresponding to the first virtual object may be another area in the interface, which is not limited in this embodiment of this application.

Figure 4:
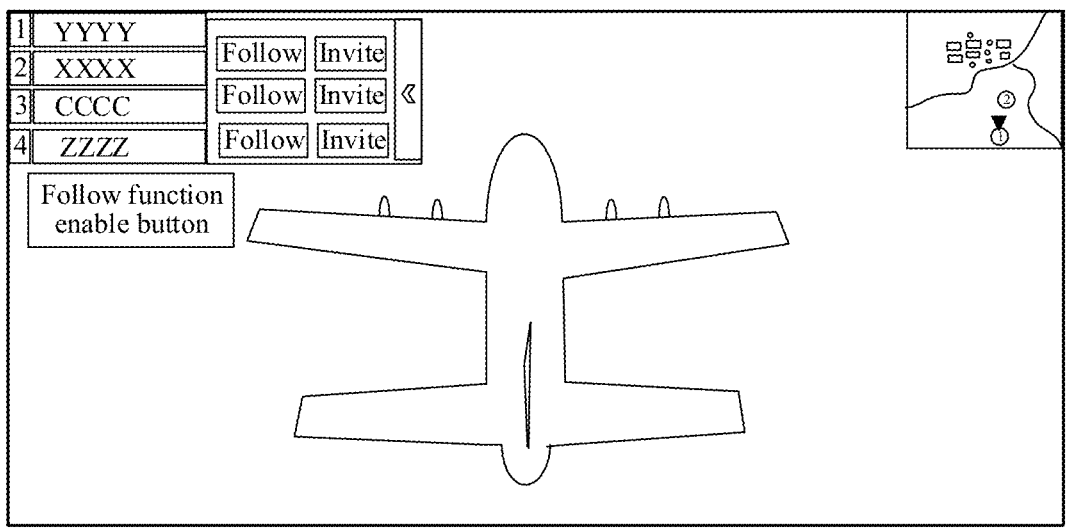
FIG. 4 is a schematic diagram of an interface of a terminal according to an embodiment of this application.
Figure 5:
FIG. 5 is a diagram of an actual interface of a terminal according to an embodiment of this application.

For example, as shown in FIG. 4, for example, the area corresponding to the first virtual object is a right area of the attribute information of the first virtual object is used. When detecting a touch operation on the follow function enable button, the terminal may display a corresponding follow button in the right area of the attribute information of the first virtual object. A diagram of an actual interface is shown in FIG. 5, and a parachute follow button is the follow function enable button. When a touch operation on the parachute follow button is detected, the follow button may be correspondingly displayed on the right side of the attribute information of the first virtual object.

In an embodiment, after step S202, when detecting a touch operation on the follow function enable button again, the terminal may also cancel the display of the follow button of the first virtual object. The user may perform the touch operation when a follow setting does not need to be changed, to cancel the display of the follow button, thereby reducing the blocking of the virtual scene.

Certainly, when there is one first virtual object, the terminal may display a follow button of the first virtual object in the interface. When there are a plurality of first virtual objects, the terminal may also display a follow button of each first virtual object in the interface. Certainly, the terminal may alternatively perform a display operation only when detecting a display triggering operation of the follow button. This is not limited in this embodiment of this application.

For example, in the foregoing descriptions, the terminal displays the attribute information of the first virtual object and the second virtual object in the interface, and displays the follow function enable button and the follow button around the attribute information. In a possible implementation, the terminal may alternatively display the first virtual object in the interface and correspondingly display the follow button around the first virtual object when the first virtual object and the second virtual object are forming a team, that is, the first virtual object and the second virtual object have not entered the virtual scene. The display of the follow button may not need to be triggered by a touch operation on the follow function enable button, and certainly, may be triggered by a touch operation on the follow function enable button. A display triggering condition of the follow button and the display position of the follow function enable button are not limited in this embodiment of this application.

Step S201 and step S202 are a process of displaying the follow button in the area corresponding to the first virtual object. The foregoing descriptions are provided only by using an example in which the follow function enable button is displayed in the interface, and a touch operation is performed on the follow function enable button to trigger the display of the follow button. In an embodiment, the terminal may not display the follow function enable button, but directly display the follow button in the area corresponding to the first virtual object. Which implementation is specifically used is not limited in this embodiment of this application.

The process of displaying the follow button may be alternatively: displaying the follow button in the area corresponding to the first virtual object in a case that it is detected that neither the first virtual object nor the second virtual object has entered the virtual scene or both the first virtual object and the second virtual object are in an aerial vehicle-taking state in the virtual scene. That is, before the first virtual object and the second virtual object fall or the first virtual object and the second virtual object have not entered the virtual scene or are in an aerial vehicle, the terminal may display the follow button to provide a follow function for the user.

S203: The terminal obtains falling dynamic information of the first virtual object in a virtual scene in a case that a touch operation on the follow button of the first virtual object is detected.

The falling dynamic information is motion information of a virtual object in a falling process, which may be specifically a falling direction, a falling speed, or a falling posture of the virtual object. The user may perform a touch operation on the follow button displayed on the terminal. When the user wants the second virtual object to follow a first virtual object to fall, the user may perform a touch operation on a follow button of the first virtual object. When detecting the touch operation, the terminal may obtain falling dynamic information of the first virtual object in the virtual scene, and then determine that the second virtual object follows the first virtual object. Therefore, the falling dynamic information of the first virtual object may be used as a basis for controlling the second virtual object to fall, so that falling dynamic information of the second virtual object is consistent with the falling dynamic information of the first virtual object, thereby achieving an effect that the second virtual object follows the first virtual object to fall.

In an embodiment, when the touch operation on the follow button of the first virtual object is detected, first prompt information is displayed in a surrounding area of attribute information of the second virtual object displayed in an interface, the first prompt information being used for prompting that the second virtual object follows the first virtual object to fall. Specifically, the terminal may display an identifier of the first virtual object around the attribute information of the second virtual object.

In an embodiment, an invite button having an invite function may further be set in the terminal, and the user may use the invite button having the invite function to invite another virtual object to follow the virtual object controlled by the user to fall. Specifically, the terminal displays an invite button in the area corresponding to the first virtual object, the invite button being used for inviting the first virtual object to follow the second virtual object to fall. In an embodiment, a display triggering manner of the invite button may be the same as that of the follow button. When detecting a touch operation on the follow function enable button, the terminal may display the invite button.

In an embodiment, in step S203, when detecting a touch operation on the follow button of the first virtual object, the terminal may further set the status of the invite button of the first virtual object to a non-clickable state. That is, if it is determined currently that the second virtual object follows a first virtual object to fall, the first virtual object being followed cannot be invited to follow the second virtual object to fall. When detecting a touch operation on the invite button that is in the non-clickable state, the terminal may ignore the touch operation.

Figure 6:
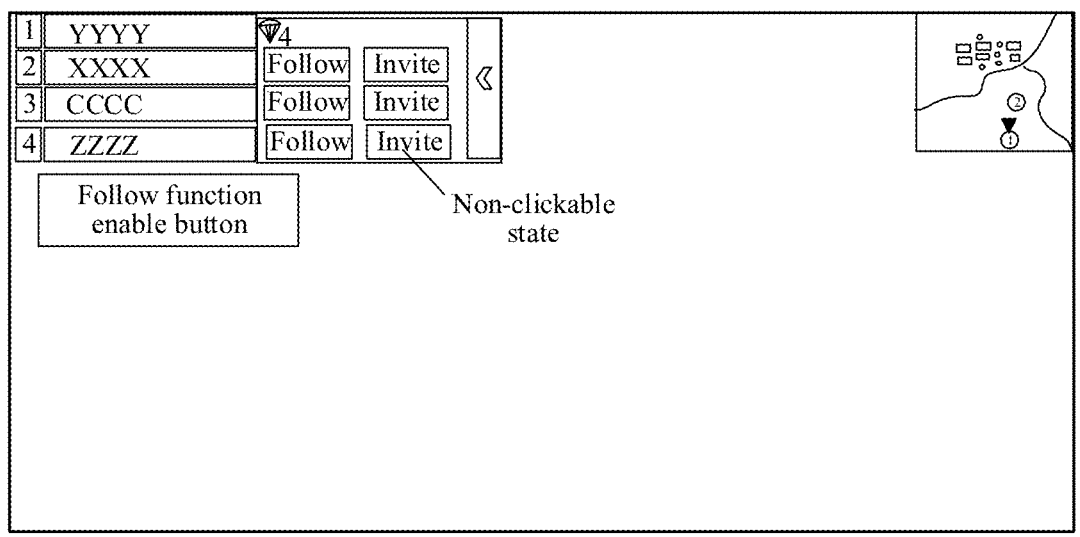
FIG. 6 is a schematic diagram of an interface of a terminal according to an embodiment of this application.
Figure 7:
FIG. 7 is a diagram of an actual interface of a terminal according to an embodiment of this application.

For example, as shown in FIG. 6, for example, a quantity of the first virtual objects is 3, an identifier of the second virtual object is No. 1, and identifiers of the first virtual objects are No. 2, No. 3, and No. 4. Currently, the first virtual object and the second virtual object have not actually entered the virtual scene. The user performs a click operation on a follow button of the first virtual object whose identifier is No. 4. When detecting the click operation, the terminal may determine that the second virtual object follows the first virtual object, and may display 4 around the attribute information of the second virtual object whose identifier is No. 1, to prompt that the second virtual object whose identifier is No. 1 is to follow the first virtual object whose identifier is No. 4. In addition, an invite button of the first virtual object whose identifier is No. 4 is set to a non-clickable state. An actual interface is shown in FIG. 7.

For the invite button, the user may also perform a touch operation on the invite button to invite the first virtual object to follow the second virtual object. Specifically, when detecting a touch operation on the invite button of the first virtual object, the terminal may transmit an invite request to a terminal of the first virtual object. When receiving an accept response from the terminal of the first virtual object, the terminal may synchronize falling dynamic information of the second virtual object to the terminal of the first virtual object, so that the falling dynamic information of the first virtual object may be consistent with the falling dynamic information of the second virtual object.

Certainly, if the terminal of the first virtual object transmits a release message or the second virtual object switches from a falling state to a standing state or a floating state in water, the terminal may stop synchronizing the falling dynamic information. The release message is used for instructing to cancel that the first virtual object follows the second virtual object to fall. The terminal may use a ray detection method to determine whether the second virtual object is in the falling state. Certainly, the terminal may alternatively perform determination based on the coordinates of the second virtual object and the coordinates of each object in the virtual scene or in another manner. This is not limited in this embodiment of this application.

Similar to that the second virtual object follows the first virtual object, in a case that the first virtual object follows the second virtual object, when the accept response from the terminal of the first virtual object is received, the terminal may display second prompt information in a surrounding area of attribute information of the first virtual object displayed in an interface, the second prompt information being used for prompting that the first virtual object follows the second virtual object to fall. Specifically, the terminal may display an identifier of the second virtual object around the attribute information of the first virtual object.

In an embodiment, when receiving the accept response from the terminal of the first virtual object, the terminal may also set the status of the follow button of the first virtual object to a non-clickable state. That is, if it is determined currently that the first virtual object follows the second virtual object to fall, the second virtual object cannot follow the first virtual object to fall.

Figure 8:
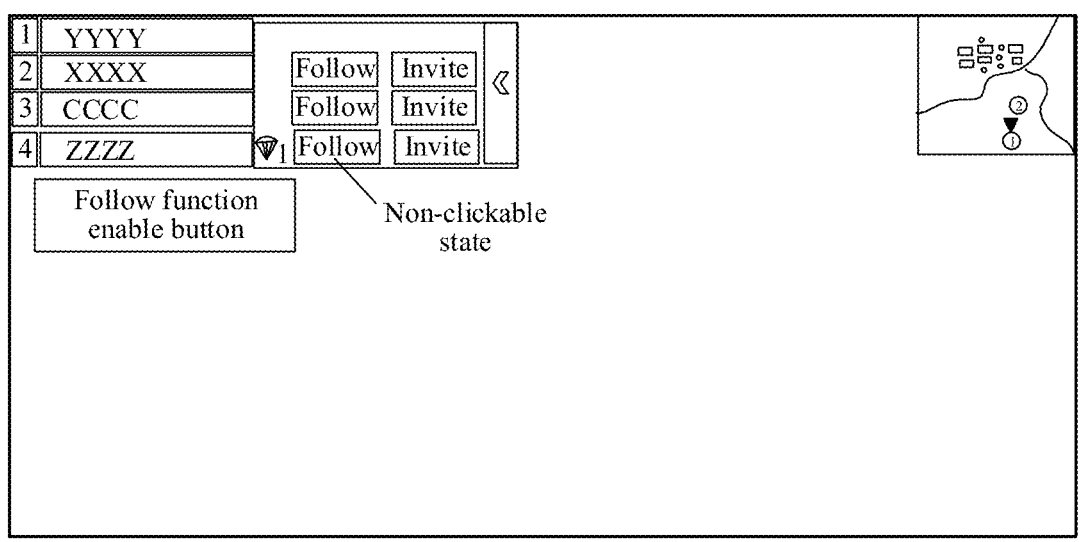
FIG. 8 is a schematic diagram of an interface of a terminal according to an embodiment of this application.

For example, as shown in FIG. 8, for example, still, a quantity of the first virtual objects is 3, an identifier of the second virtual object is No. 1, and identifiers of the first virtual objects are No. 2, No. 3, and No. 4. The user performs a click operation on an invite button of the first virtual object whose identifier is No. 4. When detecting the click operation, the terminal may transmit an invite request to a terminal of the first virtual object whose identifier is No. 4. If an accept response from the terminal of the first virtual object is received, the terminal may determine that the first virtual object whose identifier is No. 4 follows the second virtual object whose identifier is No. 1, and may display 1 around the attribute information of the first virtual object whose identifier is No. 4, to prompt that the first virtual object whose identifier is No. 4 is to follow the second virtual object whose identifier is No. 1. In addition, a follow button of the first virtual object whose identifier is No. 4 is set to a non-clickable state.

In this embodiment of this application, the user may freely select the first virtual object that the second virtual object is to follow, or may invite the first virtual object to follow the second virtual object, and the operations are flexible and convenient.

S204: The terminal controls the second virtual object to fall in the virtual scene according to the falling dynamic information.

In step S203, the terminal determines that the second virtual object follows a first virtual object, and obtains falling dynamic information of the first virtual object. Therefore, the falling dynamic information of the second virtual object may be controlled to be the same as the falling dynamic information of the first virtual object, thereby achieving an effect that the second virtual object follows the first virtual object to fall.

In an embodiment, in the virtual scene, in a process in which the second virtual object falls according to the falling dynamic information, the terminal may control a distance between the first virtual object and the second virtual object to be kept less than a preset distance. The preset distance is a distance in the virtual scene, and the preset distance may be preset by a related technician. For example, the preset distance may be seven meters, so that the distance between the first virtual object and the second virtual object is not very long, and the first virtual object and the second virtual object may cooperate to fight against a virtual object in another team when falling to the land.

In an embodiment, when determining that the second virtual object is in a falling state in the virtual scene, the terminal may further cancel the display of the follow function enable button in the interface.

Figure 9:
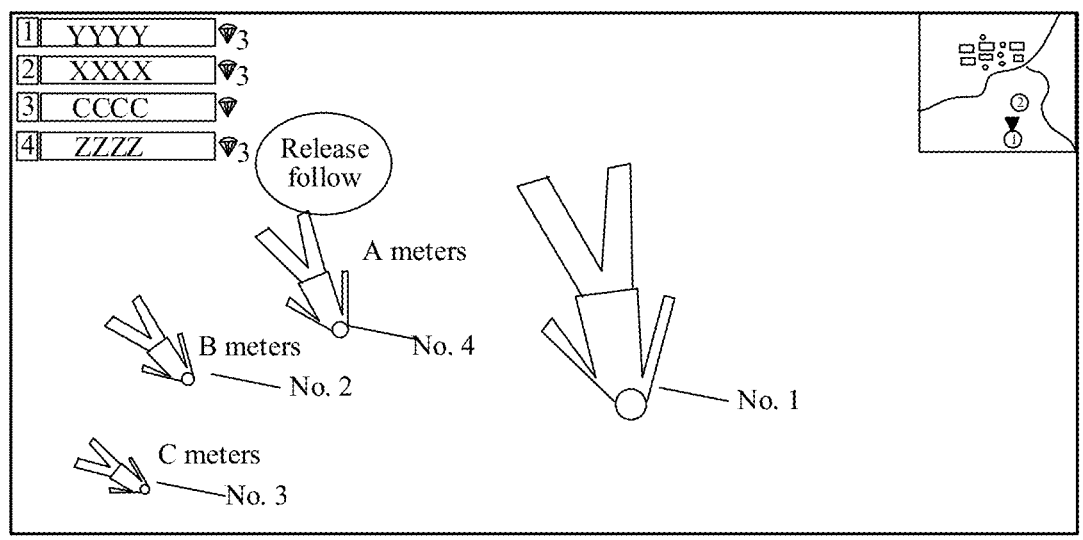
FIG. 9 is a schematic diagram of an interface of a terminal according to an embodiment of this application.
Figure 10:
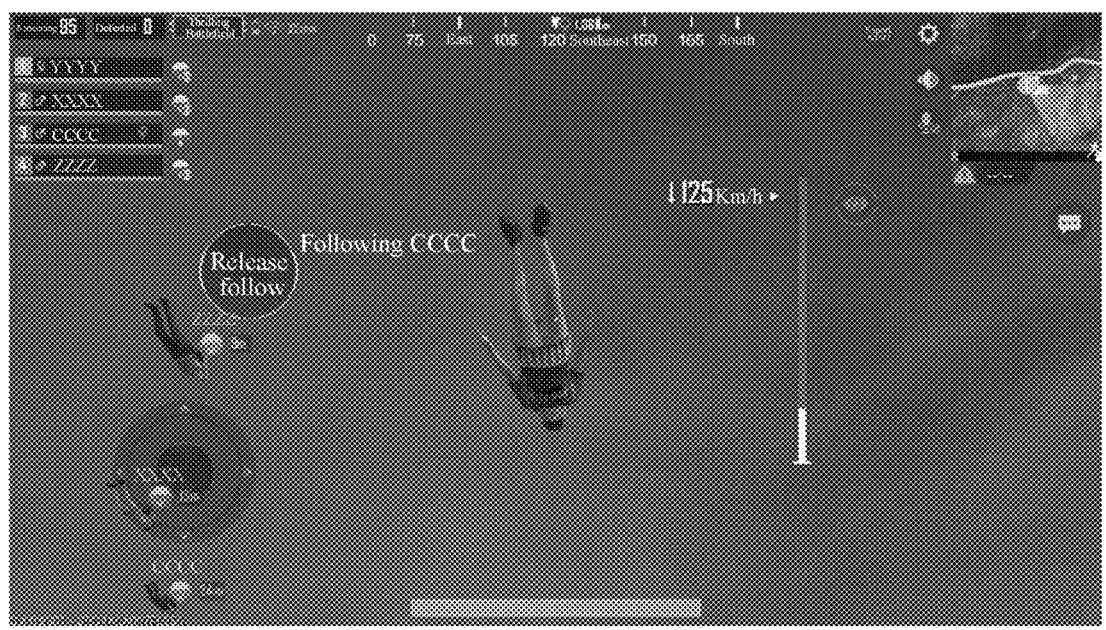
FIG. 10 is a diagram of an actual interface of a terminal according to an embodiment of this application.

For example, as shown in FIG. 9, an identifier of the second virtual object is No. 1, identifiers of the first virtual objects are No. 2, No. 3, and No. 4, and currently the second virtual object whose identifier is No. 1, the first virtual object whose identifier is No. 2, and the first virtual object whose identifier is No. 4 all follow the first virtual object whose identifier is No. 3. When the first virtual object whose identifier is No. 3 leaves the aerial vehicle and enters a falling state, the second virtual object and other first virtual objects all leave the aerial vehicle at the same time and enter a falling state, and there is a particular distance between them. For example, the first virtual object whose identifier is No. 3 falls C meters, the first virtual object whose identifier is No. 2 falls B meters, and the first virtual object whose identifier is No. 4 falls A meters. Differences between the values of A, B, and C are not excessively large, so that a distance between the virtual objects in a follow state is not excessively large. In addition, the terminal cancels the display of the follow function enable button in the interface, and an actual interface is shown in FIG. 10.

In step S203 and step S204, the terminal may obtain whether the first virtual object switches from an aerial vehicle-taking state to a falling state. If yes, the terminal updates the status of the second virtual object as soon as the status of the first virtual object changes, and performs step S203 and step S204. Specifically, the terminal may obtain the falling dynamic information of the first virtual object in real time, and control the second virtual object to fall according to the falling dynamic information. If not, the terminal controls the second virtual object to continue taking the aerial vehicle.

In an embodiment, after the second virtual object follows the first virtual object while the first virtual object and the second virtual object are not in a falling state, that is, the first virtual object and the second virtual object have not entered the virtual scene or are in an aerial vehicle-taking state in the virtual scene, the terminal may further change, when detecting a touch operation on the follow button of the first virtual object, the follow button of the first virtual object into a cancel button in step S203. The cancel button may be used for canceling that the second virtual object follows the first virtual object to fall. When detecting a touch operation on the cancel button, the terminal may cancel that the second virtual object follows the first virtual object to fall, and switch the cancel button of the first virtual object back to the follow button. Certainly, the user may perform a touch operation on the cancel button and then perform a touch operation on the follow button of another first virtual object, to change the first virtual object that is to follow. Alternatively, the user may not perform a touch operation on the cancel button after step S203, and directly perform a touch operation on the follow button of another first virtual object, to change the first virtual object that is to follow. Similarly, the follow button or the cancel button of the first virtual object is updated accordingly. That is, the second virtual object may follow one first virtual object to fall, and a touch operation is performed by the user of the first virtual object. Certainly, another first virtual object may also follow the first virtual object followed by the second virtual object. This is not limited in this embodiment of this application.

Figure 11:
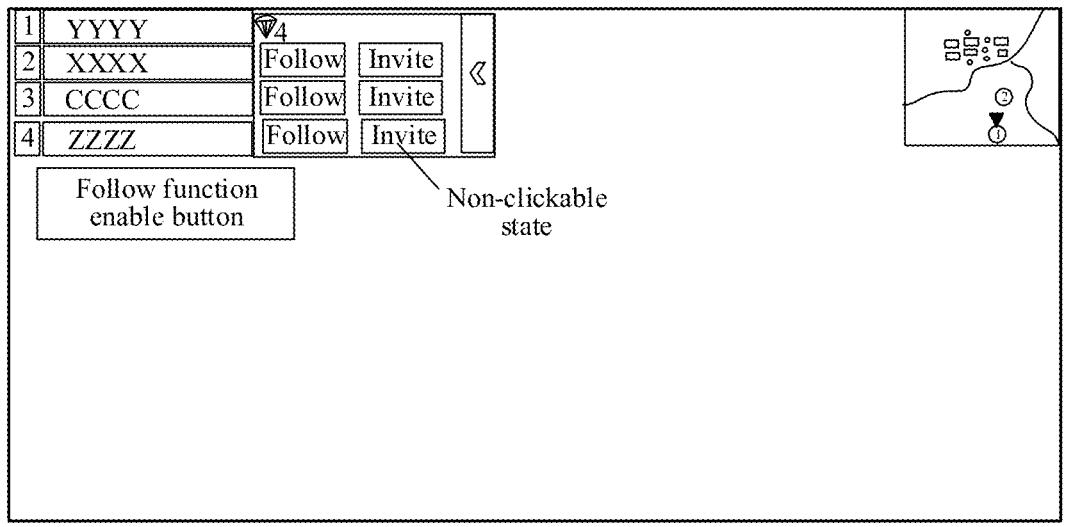
FIG. 11 is a schematic diagram of an interface of a terminal according to an embodiment of this application.

For example, as shown in FIG. 11, when detecting a touch operation on the follow button of the first virtual object whose identifier is No. 4, the terminal may change the follow button of the first virtual object into a cancel button. An actual interface is shown in FIG. 7.

In an embodiment, it may further be set in the terminal that if a virtual object is in a falling state, another virtual object cannot follow the virtual object through a touch operation. Specifically, the following two cases may be included:

In a first case, when it is detected that the first virtual object switches from the aerial vehicle-taking state to the falling state, the status of the follow button of the first virtual object is set to a non-clickable state.

For example, the user does not control the second virtual object to follow a first virtual object. At a moment, the first virtual object leaves the aerial vehicle and is in the falling state in the virtual scene. Therefore, the first virtual object and the second virtual object are not together, and the status of the first virtual object is not consistent with the status of the second virtual object in the virtual scene. The terminal cannot make the falling dynamic information of the second virtual object consistent with the falling dynamic information of the first virtual object, and therefore the terminal may set the status of the follow button of the first virtual object to a non-clickable state, to prompt the user that the first virtual object cannot be followed currently.

In a second case, when it is detected that the second virtual object switches from the aerial vehicle-taking state to the falling state, the status of the follow button of each first virtual object is set to a non-clickable state.

For example, if the user controls the second virtual object to leave the aerial vehicle and enter the falling state in the virtual scene, the second virtual object is not together with any one of the first virtual objects, and the status of the second virtual object is not consistent with the status of the first virtual object in the virtual scene. The terminal cannot make the falling dynamic information of the second virtual object consistent with the falling dynamic information of the first virtual object, and therefore the terminal may set the status of the follow button of each first virtual object to a non-clickable state, to prompt the user that none of the first virtual objects can be followed through a touch operation currently. Certainly, if the second virtual object has followed a first virtual object, the status of the follow button of each first virtual object is set to a non-clickable state, so that the user may be prompted that the first virtual object to follow cannot be changed currently.

S205: The terminal ignores a falling dynamic information adjustment operation for the second virtual object in a case that the falling dynamic information adjustment operation is detected.

Because the second virtual object follows the first virtual object to fall, the user does not need to perform an operation on the terminal, and the second virtual object is to follow the first virtual object to fall. If the first virtual object falls, the second virtual object also follows to fall, and the second virtual object falls in the same way as the first virtual object falls. If the user performs a falling dynamic information adjustment operation on the terminal, the terminal may ignore the falling dynamic information adjustment operation when detecting the falling dynamic information adjustment operation, and does not adjust the falling dynamic information of the second virtual object. The falling dynamic information of the second virtual object is to be kept consistent with the falling dynamic information of the first virtual object.

The falling dynamic information adjustment operation may be a touch operation on a virtual joystick area, and the falling dynamic information adjustment operation may be used to change a falling direction, a falling speed or a falling posture of a virtual object. For the virtual joystick area, the shape of the virtual joystick area may be circular or semicircular, which is not specifically limited in this embodiment of this application. There may be an origin in the virtual joystick area, and the origin may be located at the center of the virtual joystick area or may be at another specified position, which is not specifically limited in this embodiment of this application. The terminal may determine, according to a relative position between an end point of a touch operation of the user and the origin, a direction in which and a speed at which the user intends to control the virtual object to move. This is not described in detail in this embodiment of this application.

For example, in a scene of a team game, the user may use the touch operation to select which first virtual object the second virtual object is to follow, so that the second virtual object follows the first virtual object to fall without the user performing any operation, and only the user controlling the first virtual object needs to perform a touch operation on the terminal. In addition, if the user performs a touch operation on the terminal to change the falling dynamic information of the second virtual object, the terminal does not respond to the touch operation.

In step S205, descriptions are provided only by using an example in which the second virtual object follows the first virtual object to fall in the virtual scene, and the falling dynamic information adjustment operation does not change the falling dynamic information of the second virtual object. In another possible implementation, when detecting a falling dynamic information adjustment operation, the terminal may cancel the follow state of the second virtual object, and adjust the falling dynamic information of the second virtual object based on a user operation.

Specifically, when detecting the falling dynamic information adjustment operation for the second virtual object, the terminal may use current falling dynamic information of the first virtual object as initial falling dynamic information of the second virtual object, and then adjust the falling dynamic information of the second virtual object according to the falling dynamic information adjustment operation. In this way, a choice of the user is more considered, and an operation manner for releasing the second virtual object from following is further provided.

In an embodiment, to make the user better observe a surrounding environment in the falling process to select a landing point based on the surrounding environment or observe whether there is another virtual object in the surrounding environment, the terminal may further provide a viewing angle function button. When detecting a touch operation on the viewing angle function button, the terminal may adjust the viewing angle according to an operation direction of the touch operation on the viewing angle function button without changing a moving direction of the virtual object. The touch operation may be performed on a specified area centered on the viewing angle function button. The shape of the specified area may be circular or may be another shape. The shape and size of the specified area are not specifically limited in this application. When detecting that the touch operation on the viewing angle function button disappears, the terminal may adjust the viewing angle to a viewing angle before the touch operation is performed on the viewing angle function button.

In an embodiment, a specific operation performed by the user on the viewing angle function button may be: pressing the viewing angle function button first, and performing a sliding or dragging operation near the viewing angle function button. When detecting the touch operation performed by the user on the viewing angle function button, the terminal may adjust the viewing angle based on the user operation, and provide a virtual scene according to the adjusted viewing angle. A display style of the viewing angle function button may be in any form, for example, in the form of an eye, which is not limited in this embodiment of this application.

Correspondingly, when detecting a touch operation on the viewing angle function button, the terminal may display a virtual scene corresponding to the adjusted viewing angle according to the touch operation. That is, when the second virtual object follows the first virtual object, the user may change a viewing angle without changing the falling dynamic information of the second virtual object through a touch operation, to observe the surrounding environment in the virtual scene.

Figure 12:
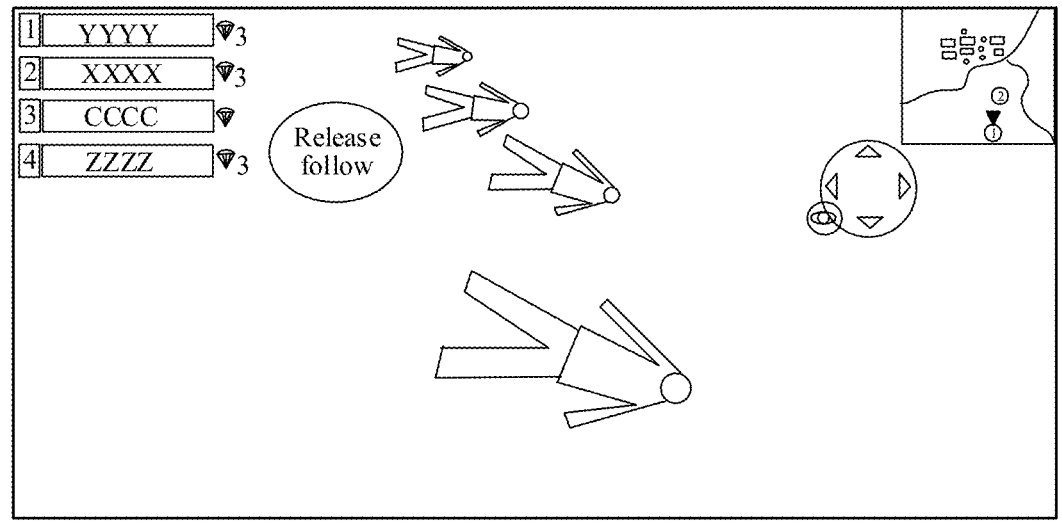
FIG. 12 is a schematic diagram of an interface of a terminal according to an embodiment of this application.
Figure 13:
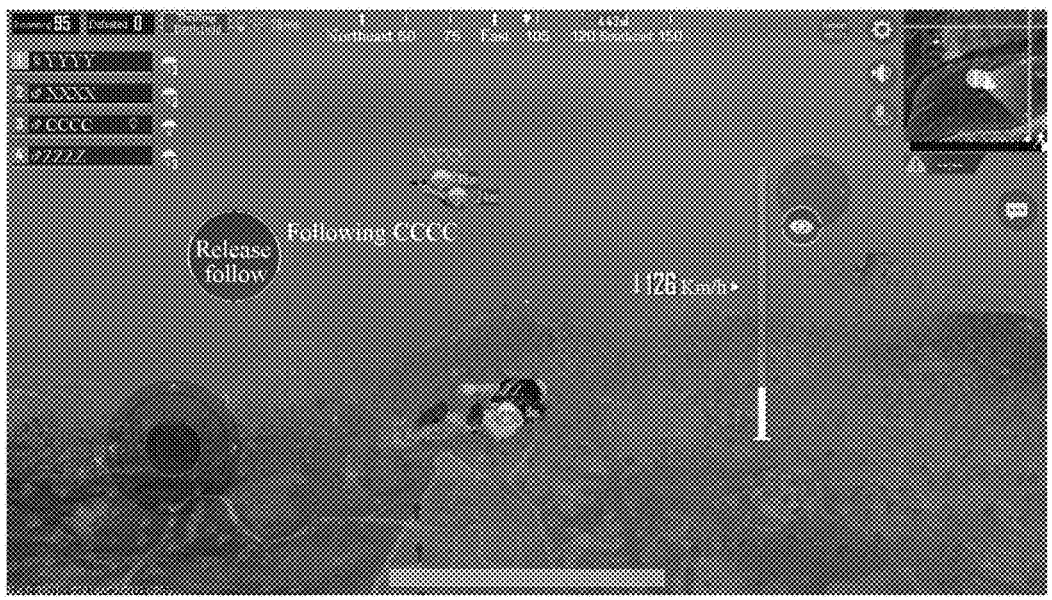
FIG. 13 is a diagram of an actual interface of a terminal according to an embodiment of this application.

For example, as shown in FIG. 12, the user drags the viewing angle function button, and then the terminal may display the virtual scene according to the adjusted viewing angle without changing the current falling dynamic information of the second virtual object. An actual interface is shown in FIG. 13.

In an embodiment, the foregoing descriptions are provided only by using an example in which the user performs a touch operation on the follow button of the first virtual object, so that the terminal may control the second virtual object to follow the first virtual object. If the first virtual object is in the state of following a third virtual object to fall, the terminal may control the second virtual object to follow the third virtual object. The third virtual object is a first virtual object other than the first virtual object corresponding to the follow button. For example, if the user performs a touch operation on the follow button of the first virtual object whose identifier is No. 4, the first virtual object whose identifier is No. 2 and the first virtual object whose identifier is No. 3 may be referred to as the third virtual object.

Specifically, when a touch operation on the follow button of a first virtual object is detected and the first virtual object follows a third virtual object to fall, the terminal may obtain falling dynamic information of the third virtual object, so that the terminal may control the second virtual object to fall according to the falling dynamic information in the virtual scene. Correspondingly, the terminal may display third prompt information in the interface, the third prompt information being used for prompting that the second virtual object follows the third virtual object to fall.

The foregoing step S201 to step S205 provide descriptions that the user may perform a touch operation to make the second virtual object follow the first virtual object to fall. Before the first virtual object and the second virtual object switch from a falling state to a standing state or a floating state in water, if the user does not want the second virtual object to continue following the first virtual object to fall, a related operation may further be performed to cancel the follow state. For details, refer to the following step S206 to step S208.

S206: The terminal displays a follow release button in the interface, the follow release button being used for canceling that the second virtual object follows the first virtual object to fall.

A display position of the follow release button may be preset by a related technician or may be adjusted by the user according to a use habit of the user. This is not limited in this embodiment of this application.

The terminal may perform step S206 right after step S203 to display the follow release button. Certainly, the terminal may alternatively perform step S206 when detecting that the second virtual object follows the first virtual object to be in a falling state in the virtual scene. Certainly, the terminal may alternatively perform step S206 at the moment of determining that the second virtual object follows the first virtual object to fall. An execution moment of step S206 is not specifically limited in this embodiment of this application.

Figure 14:
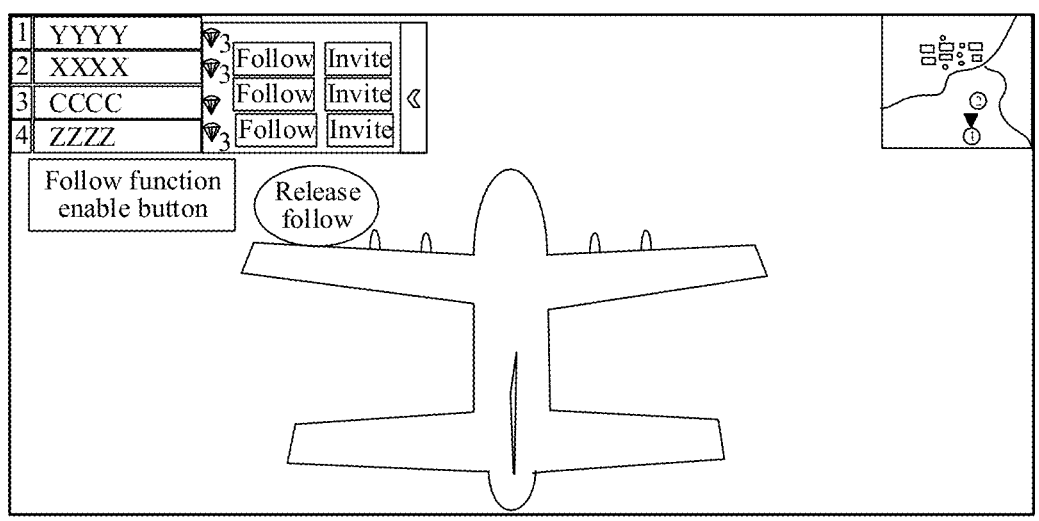
FIG. 14 is a schematic diagram of an interface of a terminal according to an embodiment of this application.
Figures 15, 16:
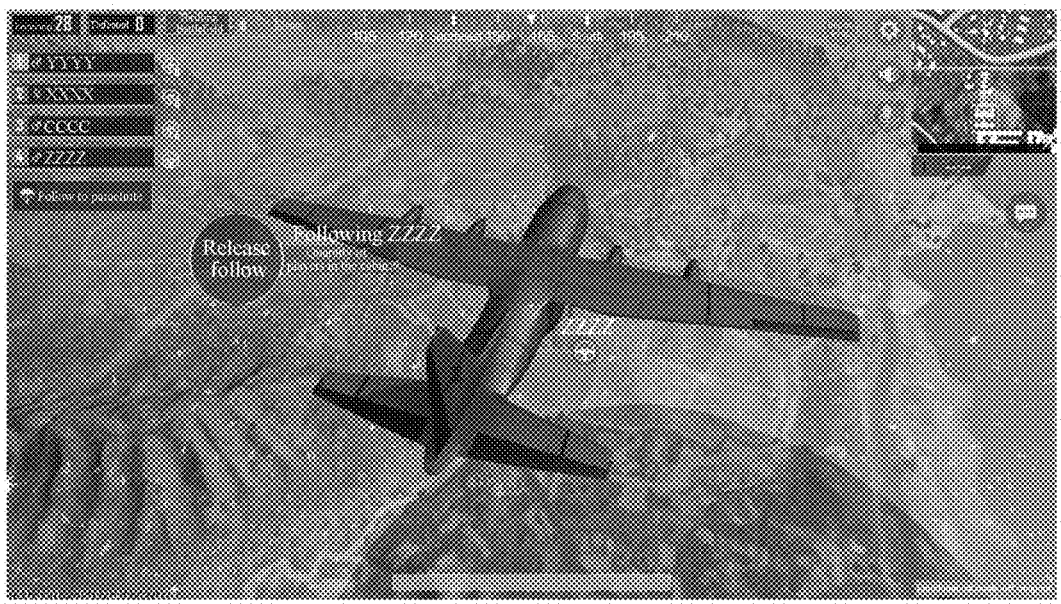
FIG. 15 is a diagram of an actual interface of a terminal according to an embodiment of this application.
FIG. 16 is a schematic diagram of an interface of a terminal according to an embodiment of this application.

For example, as shown in FIG. 12 and FIG. 14, the terminal performs step S206 right after step S203. When the second virtual object is already in a falling state or the second virtual object is in an aerial vehicle-taking state, the terminal may display the follow release button. Actual interfaces are shown in FIG. 13 and FIG. 15.

S207: The terminal uses current falling dynamic information of the first virtual object as initial falling dynamic information of the second virtual object in a case that a touch operation on the follow release button is detected.

When detecting the touch operation performed by the user on the follow release button, the terminal may determine to cancel that the second virtual object follows the first virtual object to fall. Subsequently, the user needs to manually perform a touch operation to control the second virtual object to fall. Because the falling dynamic information of the second virtual object is consistent with that of the first virtual object at the moment of canceling, the terminal may obtain the current falling dynamic information of the first virtual object as the initial falling dynamic information of the second virtual object, and change the falling dynamic information of the second virtual object after detecting a falling dynamic information adjustment operation of the user subsequently. Correspondingly, the terminal may cancel the display of the first prompt information or the third prompt information in the interface.

In an embodiment, when detecting a touch operation on the follow release button, the terminal may set the follow button and the invite button of each first virtual object to a non-clickable state. In this implementation, if the user does not want the second virtual object to follow the first virtual object to fall, the terminal may set the follow button and the invite button of each first virtual object to a non-clickable state, to prompt the user that a follow release function is successfully triggered. Certainly, the terminal may further perform the step of updating the status of the follow button and the status of the invite button before the second virtual object enters a falling state. If the terminal detects that the second virtual object has left the aerial vehicle and is in a falling state in the virtual scene, the terminal may cancel the display of the follow function enable button, the follow button, and the invite button in the interface. This is not limited in this embodiment of this application.

S208: The terminal adjusts falling dynamic information of the second virtual object according to a falling dynamic information adjustment operation for the second virtual object in a case that the falling dynamic information adjustment operation is detected.

If the second virtual object is released from the first virtual object and does not follow the first virtual object to fall, the terminal of the first virtual object does not need to synchronize the falling dynamic information of the first virtual object to the terminal of the second virtual object, and the user of the terminal may manually control the second virtual object to fall. Therefore, the user may perform a falling dynamic information adjustment operation on the terminal. When detecting the falling dynamic information adjustment operation, the terminal may adjust the falling dynamic information of the second virtual object.

The step of setting the follow button or the invite button to a non-clickable state in the foregoing step S203, step S204, and step S207 is a process of updating the status of the follow button or the invite button of the first virtual object according to the status of the first virtual object, the status of the second virtual object or the case of following or being followed of the second virtual object. Certainly, the step of changing the follow button into the cancel button or switching the cancel button back to the follow button is also a process of updating the status of the follow button or the invite button of the first virtual object. Certainly, there may be specifically another state updating process, which is not enumerated herein in this embodiment of this application.

The foregoing describes a case in which the user performs a touch operation on the follow button of the first virtual object, and the terminal may control, based on the touch operation, the second virtual object to follow the first virtual object to fall. In a possible implementation, the terminal may further receive an invite request transmitted by the terminal of the first virtual object. Based on the invite request, it may also be implemented that the second virtual object follows the first virtual object to fall. For details, refer to step S209 to step S211.

S209: The terminal displays an invite pop-up window in an interface in a case that an invite request transmitted by a terminal of the first virtual object is received, the invite pop-up window including an accept button and a reject button.

Similar to the processing manner for the touch operation on the invite button provided in step S203, a user of the terminal of the first virtual object may also perform a touch operation on an invite button of the second virtual object, to trigger the terminal of the first virtual object to transmit an invite request to the terminal of the second virtual object. When receiving the invite request, the terminal may display an invite pop-up window in the interface. The invite pop-up window is used for prompting the user that the first virtual object invites the second virtual object to follow the first virtual object to fall. The invite pop-up window may include an accept button and a reject button. The accept button is used for triggering the second virtual object to follow the first virtual object to fall, and the reject button is used for determining that the second virtual object does not follow the first virtual object to fall.

Certainly, the invite pop-up window may further include an identifier of the first virtual object and all or some of the attribute information of the first virtual object. Specific content included in the invite pop-up window is not limited in this embodiment of this application.

In an embodiment, the terminal may further display remaining valid duration of the invite pop-up window in the invite pop-up window. When the remaining valid duration is 0, the terminal may cancel the display of the invite pop-up window in the interface. The remaining valid duration is used for indicating a remaining display time of a current invite pop-up window. An operation performed by the user on the content included in the invite pop-up window is valid when the remaining valid duration is not 0. When the remaining valid duration is 0, the invite pop-up window disappears, and the user can no longer perform an operation on the content in the invite pop-up window.

S210: The terminal transmits an accept response to the terminal of the first virtual object in a case that a touch operation on the accept button is detected.

If the user wants to accept an invitation of a teammate, the user may perform a touch operation on the accept button in the invite pop-up window. When detecting the touch operation, the terminal may determine that the second virtual object follows the first virtual object to fall, and transmit an accept response to the terminal of the first virtual object. The terminal of the first virtual object may transmit the falling dynamic information of the first virtual object to the terminal, so that the terminal may perform step S204 to control the second virtual object to fall according to the falling dynamic information of the first virtual object.

In an embodiment, similar to step S203, in step S210, the terminal may also display the first prompt information in the interface, to prompt that the second virtual object follows the first virtual object to fall.

S211: The terminal transmits a reject response to the terminal of the first virtual object in a case that a touch operation on the reject button is detected.

If the user does not want to accept an invitation of a teammate, the user may also perform a touch operation on the reject button in the invite pop-up window. When detecting the touch operation, the terminal may determine that the second virtual object does not follow the first virtual object to fall, and transmit a reject response to the terminal of the first virtual object, so that the terminal of the first virtual object does not need to synchronize the falling dynamic information of the first virtual object to the terminal.

In an embodiment, to improve the convenience of user operations, an automatic accept function or automatic reject function may further be set in the terminal. The terminal may determine to accept or reject an invitation according to a current state of the second virtual object.

The automatic accept function may be specifically that in a case that the invite request transmitted by the terminal of the first virtual object is received, the second virtual object is in a free falling state, and no touch operation on either the accept button or the reject button in the invite pop-up window is detected within preset duration, the terminal may control the second virtual object to fall according to the falling dynamic information of the first virtual object in the virtual scene in response to the invite request. The free falling state indicates a state that the second virtual object does not follow any first virtual object to fall and no first virtual object follows the second virtual object to fall.

The automatic reject function may be specifically that in a case that the invite request transmitted by the terminal of the first virtual object is received, the second virtual object is in a team falling state, and no touch operation on either the accept button or the reject button in the invite pop-up window is detected within preset duration, the terminal may reject the invite request. The team falling state indicates a state that the second virtual object follows another first virtual object to fall or another first virtual object follows the second virtual object to fall.

The preset duration may be preset by a related technician or may be adjusted by the user according to a use habit of the user. This is not limited in this embodiment of this application.

Figure 17:
FIG. 17 is a diagram of an actual interface of a terminal according to an embodiment of this application.

For example, as shown in FIG. 16, when receiving an invite request, the terminal may display an invite pop-up window in the interface. The invite pop-up window includes an accept button and a reject button. Currently, the second virtual object does not follow another first virtual object to fall, and no first virtual object follows the second virtual object to fall. That is, the second virtual object does not fall in a team. Therefore, the terminal may display remaining valid duration of the invite pop-up window at the accept button within preset duration. A maximum value of the remaining valid duration is the preset duration. When the remaining valid duration is 0, the terminal may transmit an accept response to the terminal of the first virtual object, and control the second virtual object to follow the first virtual object to fall. An actual interface is shown in FIG. 17.

Figure 18:
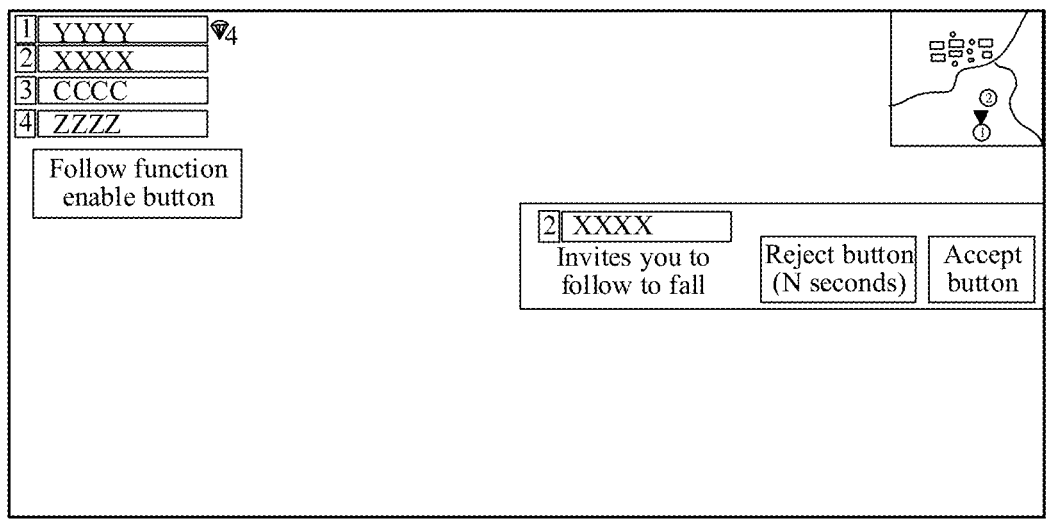
FIG. 18 is a schematic diagram of an interface of a terminal according to an embodiment of this application.
Figure 19:
FIG. 19 is a diagram of an actual interface of a terminal according to an embodiment of this application.

As shown in FIG. 18, when receiving an invite request, the terminal may display an invite pop-up window in the interface. The invite pop-up window includes an accept button and a reject button. Currently, the second virtual object follows a first virtual object whose identifier is No. 4 to fall, that is, the second virtual object is in a team falling state. Therefore, the terminal may display remaining valid duration of the invite pop-up window at the reject button within preset duration. A maximum value of the remaining valid duration is the preset duration. When the remaining valid duration is 0, the terminal may transmit a reject response to the terminal of the first virtual object whose identifier is No. 2, and continue controlling the second virtual object to follow the first virtual object whose identifier is No. 4 to fall. An actual interface is shown in FIG. 19.

By using the automatic response function, the terminal may provide the accept button or the reject button in the invite pop-up window, to provide the automatic accept function and the automatic reject function as soon as the accept response or the reject response is transmitted to the terminal of the first virtual object based on a result of manual selection of the user, so that the user may implement a follow accept function or a follow reject function without performing a touch operation, thereby improving the convenience of operations while providing the right of manual selection for the user.

In an embodiment, to reduce the complexity of user operations and improve the convenience of operations, when detecting a marking operation of the first virtual object in a global map, the terminal may further control the second virtual object to fall according to the falling dynamic information of the first virtual object in the virtual scene, thereby further reducing the complexity of user operations. For example, in a video game scenario, a marking operation may be generally performed in a global map to determine the position of a landing point, so that a virtual object may be controlled through a touch operation to fall to the position of the landing point. In a team game, an area of the landing point of the same team may be determined in the marking manner, so that virtual objects of the same team all fall near the marked location and then may cooperate to fight against a virtual object of another team. In this embodiment of this application, the user may control, without performing the operation of setting a following relationship, the virtual object to automatically follow a virtual object controlled by a user who performs the marking operation, thereby reducing the complexity of user operations and improving the convenience of operations.

In an embodiment, to reduce the complexity of user operations and improve the convenience of operations, when detecting a touch operation on an invite button, the terminal may transmit invite requests to terminals of all the first virtual objects, and the user does not need to perform a touch operation on the invite button of each first virtual object one by one, thereby further reducing the complexity of user operations.

The following describes in detail changes in a specific following relationship between virtual objects when the method for controlling falling of a virtual object is applied to a video game scenario.

Figure 20:
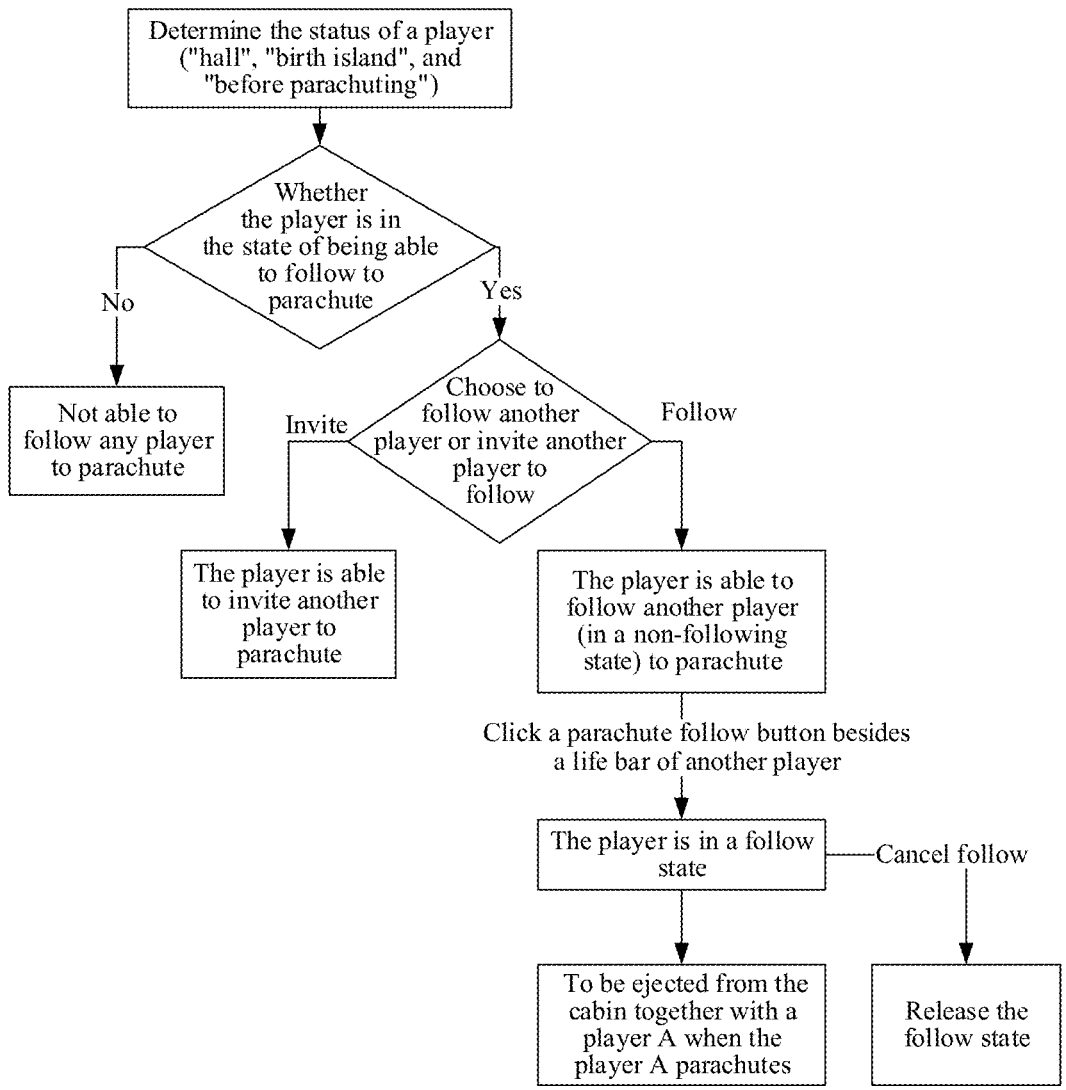
FIG. 20 is a flowchart of a method for controlling falling of a virtual object according to an embodiment of this application.

As shown in FIG. 20, the terminal may determine the status of the player, that is, the status of the second virtual object. "Hall", "birth island", and "before parachuting" respectively refer to that the second virtual object has not entered the virtual scene and the second virtual object is in an aerial vehicle-taking state in the virtual scene, so that it may be determined, according to the status of the player, whether the player is in a state of being able to follow to parachute. The state of being able to follow to parachute is the state of "hall", "birth island", and "before parachuting". That is, currently the second virtual object is in the state of being able to follow the first virtual object or to be followed by the first virtual object. If a player is not in any foregoing state, the terminal determines that the player cannot follow any player to parachute. The parachuting is falling. If a player is in any foregoing state, the player may choose to follow another player or invite another player to follow the player. When the user chooses to follow another player, for example, the player may follow another player A to parachute, the another player A needs to be in the state of not following another player, so that the user may click a parachute follow button besides a life bar of the another player A, that is, the follow button around the attribute information, to enable the player to enter a follow state. If the player A followed by the player leaves an aerial vehicle to parachute, the player is ejected from the cabin and parachutes at the same time. If the user performs a click operation on a follow release button or a cancel button, the follow state of the player is released, and the player does not follow the player A to parachute. If the user chooses to invite another player to parachute rather than to follow, the user may click an invite button, so that another player may follow the player to parachute. In an embodiment, when the player follows another player to parachute, players forming a team to parachute may share one parachute, to reduce blocking of the virtual scene in the terminal interface.

Figure 21:
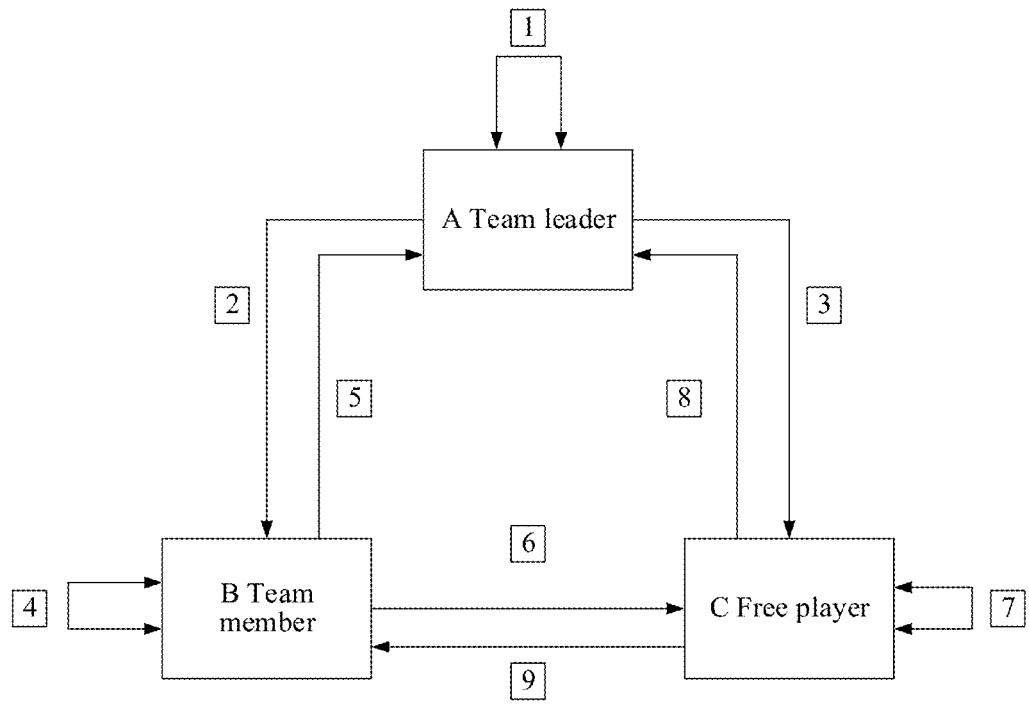
FIG. 21 is a schematic diagram of the state change of a virtual object according to an embodiment of this application.

As shown in FIG. 21, virtual objects may be in three states: "team leader", "team member", and "free player" according to whether the virtual object follows another virtual object or whether the virtual object is followed by another virtual object. The team leader is a virtual object followed by another virtual object, the team member is a virtual object following another virtual object, and the free player is a virtual object neither following another virtual object nor being followed by another virtual object, that is, the free player is in a free falling state. For example, the team leader is A, the team member is B, and the free player is C, and reference numbers 1 to 9 are steps of a virtual object in a current state following a virtual object in a state pointed by an arrow. Descriptions of the foregoing nine steps are shown in Table 1.

TABLE 1

| Step number | Description |
| --- | --- |
| 1 | A team leader brings a team member to join a team of a team leader who is followed |
| 2 | A team leader brings a team member to join a team of a team member who is followed |
| 3 | A free player becomes a team leader, and a former team leader and a team member thereof become team members of the current free player |
| 4 | A team member becomes a team member of another team leader |
| 5 | A team member becomes a team member of a team leader who is followed (switches team) |
| 6 | A free player becomes a team leader |
| 7 | Free players enter a team state |
| 8 | Join a team of a team leader |
| 9 | Join a team of a team member |

In the foregoing nine steps, a status change of a follower choosing to follow is shown in Table 2, and a status change of a person chosen to follow is shown in Table 3.

TABLE 2

| Step number | Status before change | Status after change |
| --- | --- | --- |
| 1 | Team leader | Team member |
| 2 | Team leader | Team member |
| 3 | Team leader | Team member |
| 4 | Team member | Team member |
| 5 | Team member | Team member |
| 6 | Team member | Team member |
| 7 | Free player | Team member |
| 8 | Free player | Team member |
| 9 | Free player | Team member |

TABLE 3

| Step number | Status before change | Status after change |
| --- | --- | --- |
| 1 | Team leader | Team leader |
| 2 | Team member | Team member |
| 3 | Free player | Team leader |
| 4 | Team member | Team member |
| 5 | Team leader | Team leader |
| 6 | Free player | Team leader |
| 7 | Free player | Team leader |
| 8 | Team leader | Team leader |
| 9 | Team member | Team member |

As shown in Table 1, Table 2, and Table 3, step 1 is that the team leader chooses to follow another team leader, that is, the team leader brings a team member to join a team of another team leader. A status of the follower choosing to follow is changed from a team leader into a team member, and the status of the followed is not changed and is still a team leader.

Step 2 is that the team leader chooses to follow a team member, and the team member belongs to another team, that is, the team leader brings a team member to join another team. A status of the follower is changed from a team leader into a team member, and the status of the followed is not changed and is still a team member. The follower and the followed both follow a team leader of the followed.

Step 3 is that a team leader chooses to follow a free player, and therefore the free player becomes a team leader, the former team leader and team member become team members of the free player. That is, the status of the follower is changed from a team leader into a team member, and the status of the followed is changed from a free player into a team leader.

Step 4 is that a team member chooses to follow a team member of another team, that is, the team member changes a team and becomes a team member of another team. That is, the status of the follower is not changed and is still a team member, and the status of the followed is not changed either and is still a team member.

Step 5 is that a team member chooses to follow a team leader of another team, that is, the team member changes a team. That is, the status of the follower is not changed and is still a team member, and the status of the followed is not changed either and is still a team leader.

Step 6 is that a team member chooses to follow a free player. Therefore, the free player becomes a team leader, and the team member changes a team by leaving the former team to form a team with the free player. That is, the status of the follower is not changed and is still a team member, and the status of the followed is changed from a free player into a team leader.

Step 7 is that a free player follows another free player, and the two free players form a team. That is, the status of the follower is changed from a free player into a team member, and the status of the followed is changed from a free player into a team leader.

Step 8 is that a free player chooses to follow a team leader of a team, that is, the free player joins the team of the team leader. That is, the status of the follower is changed from a free player into a team member, and the status of the followed is not changed and is still a team leader.

Step 9 is that a free player chooses to follow a team member, that is, the free player joins a team of the team member. That is, the status of the follower is changed from a free player into a team member, and the status of the followed is not changed and is still a team member.

In the embodiments of this application, when a touch operation on a follow button of a first virtual object is detected, a second virtual object may be controlled to fall according to falling dynamic information of the first virtual object, thereby ensuring that falling dynamic information of the first virtual object is kept consistent with the second virtual object during falling in a virtual scene. In addition, a distance between positions of landing points of the first virtual object and the second virtual object is very short, thereby reducing the complexity of operations, improving the efficiency of controlling a virtual object to fall, and avoiding operational errors.

An optional embodiment of this application may be formed by using any combination of all the foregoing optional technical solutions, and details are not described herein.

Figure 22:
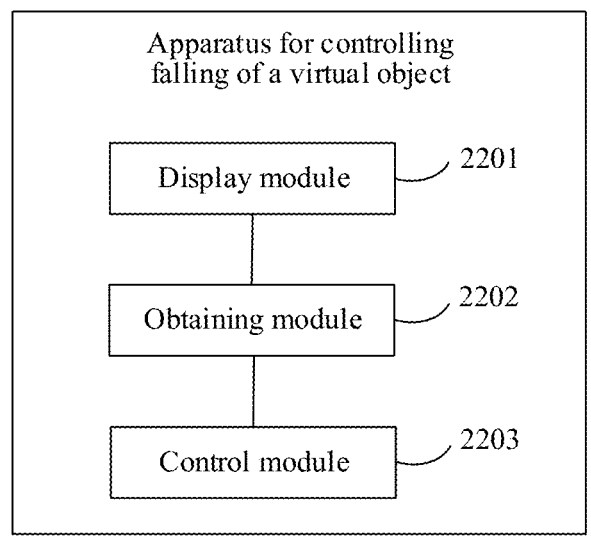
FIG. 22 is a schematic structural diagram of an apparatus for controlling falling of a virtual object according to an embodiment of this application.

FIG. 22 is a schematic structural diagram of an apparatus for controlling falling of a virtual object according to an embodiment of this application. Referring to FIG. 22, the apparatus includes:

a display module 2201, configured to display a follow button in an area corresponding to a first virtual object, the follow button being used for controlling a second virtual object to follow the first virtual object to fall;

an obtaining module 2202, configured to obtain falling dynamic information of the first virtual object in a virtual scene in a case that a touch operation on the follow button of the first virtual object is detected; and a control module 2203, configured to control the second virtual object to fall in the virtual scene according to the falling dynamic information.

In an embodiment, the display module 2201 is configured to display the follow button in the area corresponding to the first virtual object in a case that it is detected that neither the first virtual object nor the second virtual object has entered the virtual scene or both the first virtual object and the second virtual object are in an aerial vehicle-taking state in the virtual scene.

In an embodiment, the display module 2201 is configured to display a follow function enable button in an interface; and display the follow button in the area corresponding to the first virtual object in a case that a touch operation on the follow function enable button is detected.

In an embodiment, the control module 2203 is further configured to control a distance between the first virtual object and the second virtual object to be kept less than a preset distance in a process in which the second virtual object falls according to the falling dynamic information in the virtual scene.

In an embodiment, the apparatus further includes:

a first processing module, configured to ignore a falling dynamic information adjustment operation for the second virtual object in a case that the falling dynamic information adjustment operation is detected.

In an embodiment, the obtaining module 2202 is further configured to use current falling dynamic information of the first virtual object as initial falling dynamic information of the second virtual object in a case that a falling dynamic information adjustment operation for the second virtual object is detected; and the control module 2203 is further configured to adjust falling dynamic information of the second virtual object according to the falling dynamic information adjustment operation.

In an embodiment, the obtaining module 2202 is further configured to obtain falling dynamic information of a third virtual object in a case that the touch operation on the follow button of the first virtual object is detected and the first virtual object follows the third virtual object to fall; and the control module 2203 is further configured to control the second virtual object to fall in the virtual scene according to the falling dynamic information of the third virtual object.

In an embodiment, the apparatus further includes a first transmission module, where the display module 2201 is further configured to display the invite button in an area corresponding to the first virtual object, the invite button being used for inviting the first virtual object to follow the second virtual object to fall; the first transmission module is configured to transmit an invite request to a terminal of the first virtual object in a case that a touch operation on the invite button of the first virtual object is detected; and the first transmission module is further configured to synchronize falling dynamic information of the second virtual object to the terminal of the first virtual object in a case that an accept response fed back by the terminal of the first virtual object is received.

In an embodiment, the display module 2201 is further configured to display first prompt information in a surrounding area of attribute information of the second virtual object displayed in an interface in a case that the touch operation on the follow button of the first virtual object is detected, the first prompt information being used for prompting that the second virtual object follows the first virtual object to fall; or the display module 2201 is further configured to display second prompt information in a surrounding area of attribute information of the first virtual object displayed in an interface in a case that the accept response fed back by the terminal of the first virtual object is received, the second prompt information being used for prompting that the first virtual object follows the second virtual object to fall.

In an embodiment, the display module 2201 is further configured to display a follow release button in an interface, the follow release button being used for canceling that the second virtual object follows the first virtual object to fall; the obtaining module 2202 is further configured to use current falling dynamic information of the first virtual object as initial falling dynamic information of the second virtual object in a case that a touch operation on the follow release button is detected; and the control module 2203 is further configured to adjust falling dynamic information of the second virtual object according to a falling dynamic information adjustment operation for the second virtual object in a case that the falling dynamic information adjustment operation is detected.

In an embodiment, the apparatus further includes:

a status update module, configured to update the status of the follow button or the invite button of the first virtual object according to the status of the first virtual object, the status of the second virtual object or the case of following or being followed of the second virtual object.

In an embodiment, the status update module is configured to:

set the status of the follow button of the first virtual object to a non-clickable state when it is detected that the first virtual object switches from the aerial vehicle-taking state to the falling state; or set the status of the follow button of each first virtual object to a non-clickable state when it is detected that the second virtual object switches from the aerial vehicle-taking state to the falling state; or set the status of the invite button of the first virtual object to a non-clickable state when a touch operation on the follow button of the first virtual object is detected; or set the status of the follow button of the first virtual object to a non-clickable state when the accept response from the terminal of the first virtual object is received; or set the follow button and the invite button of each first virtual object to a non-clickable state when a touch operation on the follow release button is detected.

In an embodiment, the apparatus further includes a second transmission module, where the display module 2201 is further configured to display an invite pop-up window in an interface in a case that an invite request transmitted by a terminal of the first virtual object is received, the invite pop-up window including an accept button and a reject button;

the second transmission module is configured to transmit an accept response to the terminal of the first virtual object in a case that a touch operation on the accept button is detected; and the second transmission module is further configured to transmit a reject response to the terminal of the first virtual object in a case that a touch operation on the reject button is detected.

In an embodiment, the display module 2201 is further configured to display remaining valid duration of the invite pop-up window in the invite pop-up window; and the display module 2201 is further configured to cancel the display of the invite pop-up window in the interface when the remaining valid duration is 0.

In an embodiment, the apparatus further includes:

a second processing module, configured to reject the invite request transmitted by the terminal of the first virtual object in a case that the invite request is received, the second virtual object is in a team falling state, and no touch operation on either the accept button or the reject button in the invite pop-up window is detected within preset duration; or a second processing module, configured to control the second virtual object to fall according to the falling dynamic information of the first virtual object in the virtual scene in response to the invite request transmitted by the terminal of the first virtual object in a case that the invite request is received, the second virtual object is in a free falling state, and no touch operation on either the accept button or the reject button in the invite pop-up window is detected within preset duration.

In an embodiment, the control module 2203 is further configured to control the second virtual object to fall in the virtual scene according to the falling dynamic information of the first virtual object in a case that a marking operation of the first virtual object in a global map is detected.

In an embodiment, the apparatus further includes: a third transmission module, configured to transmit an invite request to terminals of all first virtual objects in a case that a touch operation on the invite button is detected.

The apparatus provided in this embodiment of this application may control a second virtual object to fall according to falling dynamic information of a first virtual object when a touch operation on a follow button of the first virtual object is detected, thereby ensuring that falling dynamic information of the first virtual object is kept consistent with the second virtual object during falling in a virtual scene. In addition, a distance between positions of landing points of the first virtual object and the second virtual object is very short, thereby reducing the complexity of operations, improving the efficiency of controlling a virtual object to fall, and avoiding operational errors.

When the apparatus for controlling falling of a virtual object provided in the foregoing embodiment controls a virtual object to fall, only an example of division of the foregoing functional modules is described. In actual application, the foregoing functions may be implemented by different functional modules as required, that is, the internal structure of the apparatus is divided into different functional modules, to implement all or some of the functions described above. In addition, the embodiments of the apparatus for controlling falling of a virtual object and the method for controlling falling of a virtual object provided in the foregoing embodiments are based on the same concept. For the specific implementation process, refer to the method embodiments, and details are not described herein again.

Figure 23:
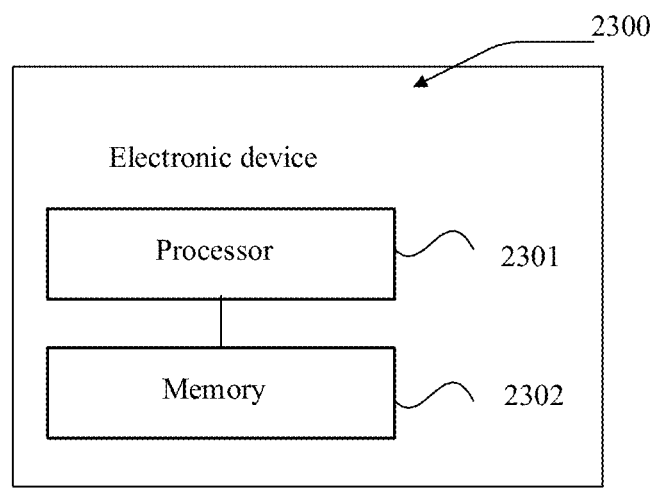
FIG. 23 is a schematic structural diagram of an electronic device according to an embodiment of this application.

FIG. 23 a schematic structural diagram of an electronic device according to an embodiment of this application. The electronic device 2300 may be specifically the terminal described above. The electronic device 2300 may vary greatly due to different configurations or performance, and may include one or more central processing units (CPU) 2301 and one or more memories 2302. The memory 2302 stores a plurality of computer-executable instructions, the computer-executable instructions being loaded and executed by the processor 2301 to implement the method for controlling falling of a virtual object provided in the foregoing method embodiments. Certainly, the electronic device may further have components such as a wired or wireless network interface, a keyboard, and an input/output interface, to facilitate input/output. The electronic device may further include another component used for implementing a device function, and details are not described herein.

In an embodiment, the apparatus for controlling falling of a virtual object provided in this application may be implemented in the form of a plurality of computer-executable instructions, and the computer-executable instructions may be run on the electronic device shown in FIG. 23. The memory in the electronic device may store program modules forming the interface display apparatus, such as the display module, the obtaining module, and the control module shown in FIG. 22. A computer program formed by the program modules causes the processor to perform the steps of the method for controlling falling of a virtual object in the embodiments of this application described in this specification.

In an embodiment, an electronic device is provided, including a memory and a processor, the memory storing a plurality of computer-executable instructions, and the computer-executable instructions, when executed by the processor, causing the processor to perform the steps of the method for controlling falling of a virtual object. The steps of the method for controlling falling of a virtual object herein may be steps of the method for controlling falling of a virtual object in the foregoing embodiments.

In an embodiment, a non-transitory computer-readable storage medium is provided, storing a plurality of computer-executable instructions, the computer-executable instructions, when executed by one or more processors, causing the processor to perform the steps of the method for controlling falling of a virtual object. The steps of the method for controlling falling of a virtual object herein may be steps of the method for controlling falling of a virtual object in the foregoing embodiments.

In an exemplary embodiment, a computer-readable storage medium, such as a memory including an instruction, is further provided. The instruction may be executed by the processor to complete the method for controlling falling of a virtual object in the foregoing embodiments. For example, the computer-readable storage medium may be a read-only memory (ROM), a random access memory (RAM), a compact disc read-only memory (CD-ROM), a magnetic tape, a floppy disk or an optical data storage device.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of this application, but are not intended to limit this application. Any modification, equivalent replacement or improvement made within the spirit and principle of this application shall fall within the protection scope of the present disclosure.

What is claimed is:

1. A method for controlling falling of a virtual object, performed by an electronic device having a processor and memory storing a plurality of computer-executable instructions to be executed by the processor, the method comprising:

displaying, in a virtual scene, a follow button in an area corresponding to a first virtual object, the follow button being used for controlling a second virtual object to follow the first virtual object to fall;

detecting a touch operation on the follow button of the first virtual object;

obtaining falling dynamic information of the first virtual object;

controlling the second virtual object to fall in the virtual scene according to the falling dynamic information;

displaying an invite pop-up window in an interface after receiving an invite request transmitted by a terminal of the first virtual object, the invite pop-up window comprising an accept button and a reject button;
transmitting an accept response to the terminal of the first virtual object when a touch operation on the accept button is detected; and
transmitting a reject response to the terminal of the first virtual object when a touch operation on the reject button is detected.

2. The method according to claim 1, wherein the displaying, in the virtual scene, the follow button in the area corresponding to the first virtual object comprises:
displaying the follow button in the area corresponding to the first virtual object after it is determined that neither the first virtual object nor the second virtual object has entered the virtual scene or both the first virtual object and the second virtual object are in an aerial vehicle-taking state in the virtual scene.

3. The method according to claim 1, wherein the displaying, in the virtual scene, the follow button in the area corresponding to the first virtual object comprises:
displaying a follow function enable button in an interface;
detecting a touch operation on the follow function enable button; and
displaying the follow button in the area corresponding to the first virtual object.

4. The method according to claim 1, further comprising:
controlling a distance between the first virtual object and the second virtual object to be kept less than a preset distance in a process in which the second virtual object falls according to the falling dynamic information in the virtual scene.

5. The method according to claim 1, further comprising:
detecting a falling dynamic information adjustment operation for the second virtual object; and
ignoring the falling dynamic information adjustment operation for the second virtual object.

6. The method according to claim 1, further comprising:
detecting a falling dynamic information adjustment operation for the second virtual object;
using current falling dynamic information of the first virtual object as initial falling dynamic information of the second virtual object; and
adjusting falling dynamic information of the second virtual object according to the falling dynamic information adjustment operation.

7. The method according to claim 1, further comprising:
obtaining falling dynamic information of a third virtual object in a case that the touch operation on the follow button of the first virtual object is detected and the first virtual object follows the third virtual object to fall; and
controlling the second virtual object to fall in the virtual scene according to the falling dynamic information of the third virtual object.

8. The method according to claim 1, further comprising:
displaying, in the virtual scene, an invite button in the area corresponding to a fourth virtual object, the invite button being used for inviting the fourth virtual object to follow the second virtual object to fall;
transmitting an invite request to a terminal of the fourth virtual object in a case that a touch operation on the invite button of the fourth virtual object is detected; and
synchronizing falling dynamic information of the second virtual object to the terminal of the fourth virtual object in a case that an accept response fed back by the terminal of the fourth virtual object is received.

9. The method according to claim 8, further comprising:
displaying, in the virtual scene, first prompt information in a surrounding area of attribute information of the second virtual object displayed in an interface in a case that the touch operation on the follow button of the fourth virtual object is detected, the first prompt information being used for prompting that the second virtual object follows the fourth virtual object to fall; or
displaying, in the virtual scene, second prompt information in a surrounding area of attribute information of the fourth virtual object displayed in an interface in a case that the accept response fed back by the terminal of the fourth virtual object is received, the second prompt information being used for prompting that the fourth virtual object follows the second virtual object to fall.

10. The method according to claim 1, further comprising:
displaying a follow release button in an interface, the follow release button being used for canceling that the second virtual object follows the first virtual object to fall;
using current falling dynamic information of the first virtual object as initial falling dynamic information of the second virtual object in a case that a touch operation on the follow release button is detected; and
adjusting falling dynamic information of the second virtual object according to a falling dynamic information adjustment operation for the second virtual object in a case that the falling dynamic information adjustment operation is detected.

11. The method according to claim 1, further comprising:
rejecting the invite request in a case that the invite request transmitted by the terminal of the first virtual object is received, the second virtual object is in a team falling state, and no touch operation on either the accept button or the reject button in the invite pop-up window is detected within preset duration; or
controlling the second virtual object to fall according to the falling dynamic information of the first virtual object in the virtual scene in response to the invite request transmitted by the terminal of the first virtual object in a case that the invite request is received, the second virtual object is in a free falling state, and no touch operation on either the accept button or the reject button in the invite pop-up window is detected within preset duration.

12. The method according to claim 1, further comprising:
controlling the second virtual object to fall in the virtual scene according to the falling dynamic information of the first virtual object in a case that a marking operation of the first virtual object in a global map is detected.

13. The method according to claim 1, further comprising:
displaying an invite button in the area corresponding to the first virtual object, the invite button being used for inviting the first virtual object to follow the second virtual object to fall; and
transmitting an invite request to terminals of all first virtual objects in a case that a touch operation on the invite button is detected.

14. An electronic device, comprising a processor and a memory, the memory storing a plurality of computer-executable instructions, the computer-executable instructions, when executed by the processor, causing the electronic device to perform operations including:
displaying, in a virtual scene, a follow button in an area corresponding to a first virtual object, the follow button being used for controlling a second virtual object to follow the first virtual object to fall;

detecting a touch operation on the follow button of the first virtual object;

obtaining falling dynamic information of the first virtual object;

controlling the second virtual object to fall in the virtual scene according to the falling dynamic information;

displaying an invite pop-up window in an interface after receiving an invite request transmitted by a terminal of the first virtual object, the invite pop-up window comprising an accept button and a reject button;

transmitting an accept response to the terminal of the first virtual object when a touch operation on the accept button is detected; and transmitting a reject response to the terminal of the first virtual object when a touch operation on the reject button is detected.

15. The electronic device according to claim 14, wherein the displaying, in the virtual scene, the follow button in the area corresponding to the first virtual object comprises:

displaying the follow button in the area corresponding to the first virtual object after it is determined that neither the first virtual object nor the second virtual object has entered the virtual scene or both the first virtual object and the second virtual object are in an aerial vehicle-taking state in the virtual scene.

16. The electronic device according to claim 14, wherein the displaying, in the virtual scene, the follow button in the area corresponding to the first virtual object comprises:

displaying a follow function enable button in an interface;

detecting a touch operation on the follow function enable button; and displaying the follow button in the area corresponding to the first virtual object.

17. The electronic device according to claim 14, wherein the operations further comprise:

controlling a distance between the first virtual object and the second virtual object to be kept less than a preset distance in a process in which the second virtual object falls according to the falling dynamic information in the virtual scene.

18. The electronic device according to claim 14, wherein the operations further comprise:

detecting a falling dynamic information adjustment operation for the second virtual object; and ignoring the falling dynamic information adjustment operation for the second virtual object.

19. A non-transitory computer-readable storage medium, storing a plurality of computer-executable instructions, the computer-executable instruction, when executed by a processor of an electronic device, causing the electronic device to perform operations including:

displaying, in a virtual scene, a follow button in an area corresponding to a first virtual object, the follow button being used for controlling a second virtual object to follow the first virtual object to fall;

detecting a touch operation on the follow button of the first virtual object;

obtaining falling dynamic information of the first virtual object;

controlling the second virtual object to fall in the virtual scene according to the falling dynamic information;

displaying an invite pop-up window in an interface after receiving an invite request transmitted by a terminal of the first virtual object, the invite pop-up window comprising an accept button and a reject button;

transmitting an accept response to the terminal of the first virtual object when a touch operation on the accept button is detected; and transmitting a reject response to the terminal of the first virtual object when a touch operation on the reject button is detected.

\* \* \* \* \*